(12) United States Patent
Stockley

(10) Patent No.: US 6,777,652 B2
(45) Date of Patent: Aug. 17, 2004

(54) PROGRAMMABLE OVEN WITH BROILER TEMPERATURE INTERLOCK

(76) Inventor: Edward E. Stockley, 8609 Lancome Dr., Plano, TX (US) 75025

(*) Notice: Subject to any disclaimer, the term of this patent is extended or adjusted under 35 U.S.C. 154(b) by 158 days.

(21) Appl. No.: 10/077,250

(22) Filed: Feb. 15, 2002

(65) Prior Publication Data

US 2003/0034342 A1 Feb. 20, 2003

Related U.S. Application Data

(63) Continuation-in-part of application No. 09/652,115, filed on Aug. 29, 2000, now Pat. No. 6,355,914, which is a continuation-in-part of application No. 09/281,041, filed on Mar. 30, 1999, now Pat. No. 6,114,663.

(51) Int. Cl.$^7$ ............................................. H05B 1/02
(52) U.S. Cl. .................. 219/486; 219/481; 219/485; 219/508; 219/411; 219/398
(58) Field of Search .................................. 219/482, 483, 219/486, 485, 497, 508, 481, 398, 411–414; 99/325–335

(56) References Cited

U.S. PATENT DOCUMENTS

| | | | |
|---|---|---|---|
| 3,828,163 A | 8/1974 | Amagami et al. | |
| 4,065,659 A | 12/1977 | Yount et al. | |
| 4,164,643 A | 8/1979 | Peart et al. | |
| 4,192,991 A | 3/1980 | Peters et al. | |
| 4,238,669 A | 12/1980 | Huntley | |
| 4,506,652 A | 3/1985 | Baker et al. | |
| 4,575,616 A | 3/1986 | Bergendal | |
| 4,761,529 A | 8/1988 | Tsisios | |
| 4,960,977 A | 10/1990 | Alden | |
| 5,157,239 A | 10/1992 | Kanaya et al. | |
| 5,378,872 A | 1/1995 | Jovanovic | |
| 5,382,441 A | 1/1995 | Lentz et al. | |
| 5,665,259 A | 9/1997 | Westerberg | |
| 5,695,668 A | 12/1997 | Boddy | |
| 5,712,464 A | 1/1998 | Westerberg | |
| 5,883,362 A | 3/1999 | Pettibone et al. | |
| 5,958,271 A | 9/1999 | Westerberg | |

Primary Examiner—Mark Paschall
(74) Attorney, Agent, or Firm—Arthur F. Zobal; Geoffrey A. Mantooth

(57) ABSTRACT

The oven includes a lower electrical heating element which is located below a support member. Two laterally spaced apart upper electrical heating elements are supported above the support member and the food to be cooked. An electrical system is provided for supplying electrical power to the lower electrical heating element and to the two upper electrical heating elements. A controller is provided for controlling electrical power applied to the lower heating element and to the two upper electrical heating elements. By way of a thermocouple, the controller senses the temperature in the oven and controls the lower heating element to maintain a set point temperature, i.e. 550° F., in the oven. When any of the upper heating elements is activated, and is in a broiling sequence the controller disables these upper heating elements if the temperature in the oven rises above an upper temperature level of i.e. 585° F.

8 Claims, 19 Drawing Sheets

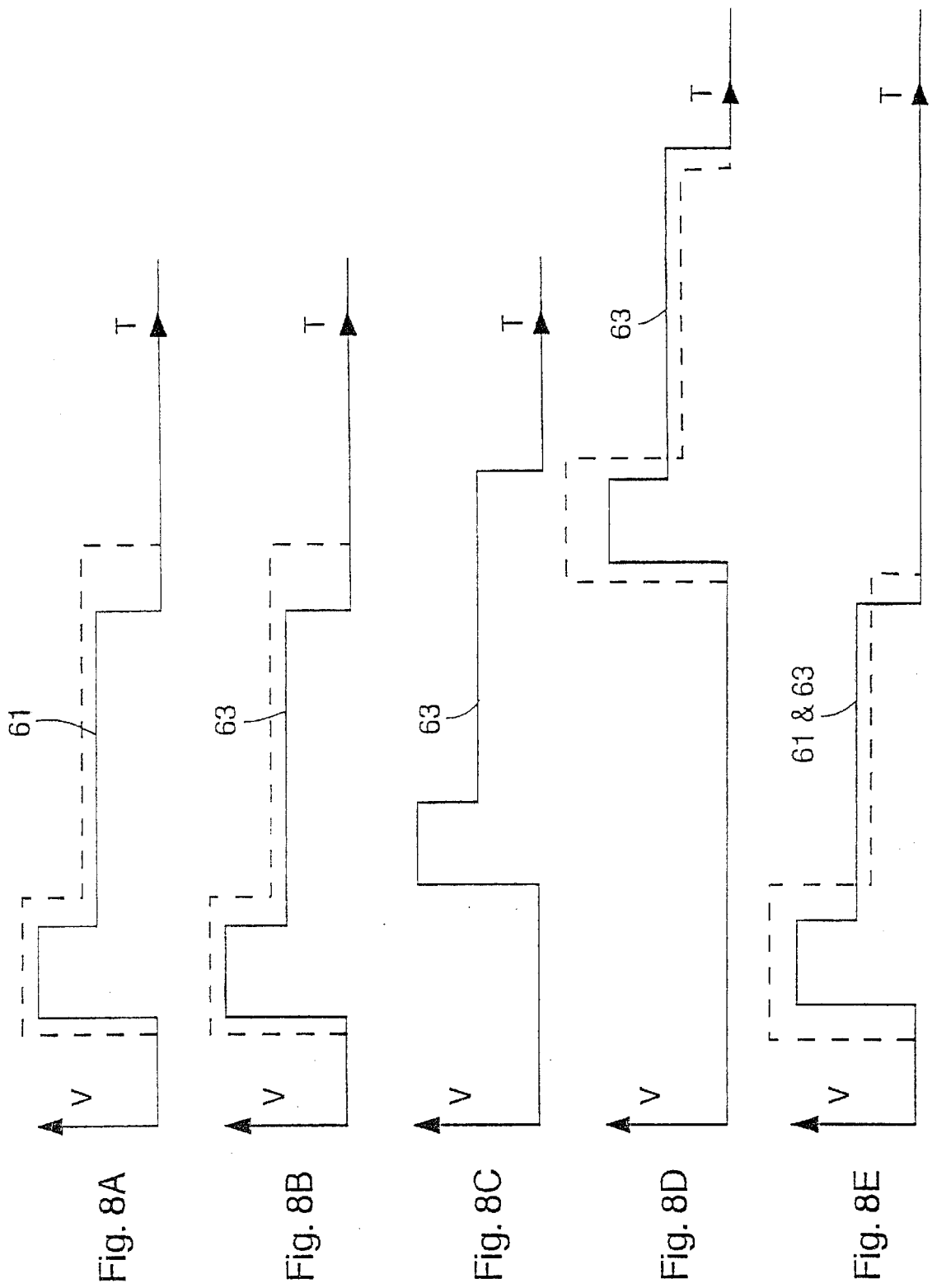

SETUP SUBMENU:

| BRINT | BROILER INTERLOCK TEMPERATURE | RANGE: TEMP LOW TO TEMP HIGH  DEFAULT: 650F (343C) |
|---|---|---|

PROGRAMMABLE OVEN WITH BROILER TEMPERATURE INTERLOCK

This application is a continuation-in-part of U.S. patent application Ser. No. 09/652,115, filed Aug. 29, 2000, now U.S. Pat. No. 6,355,914, which is a continuation-in-part of U.S. patent application Ser. No. 09/281,041, filed Mar. 30, 1999, now U.S. Pat. No. 6,114,663.

BACKGROUND OF THE INVENTION

1. Field of the Invention

The invention relates to an operator programmable oven with a menu selection feature for cooking food.

2. Description of the Prior Art

Conventional electric ovens usually are designed to cook food by heating the oven to a set temperature and using a timer to notify the operator when the time is completed. The temperature and cooking time have to be set each time a food product is to be cooked. Ovens of this type are slow and use a lot of energy and are inefficient particularly if a small food product is to be cooked. One type of electrical oven for cooking pizza is disclosed in U.S. Pat. No. 5,695,668.

Brief Description of the Oven of U.S. Pat No. 09/281,041, now U.S. Pat. No. 6,114,663

U.S. patent application Ser. No. 09/281,041, now U.S. Pat. No. 6,114,663 discloses an electrically operated oven for cooking food such as pizza which can cook food quickly and economically and which can be programmed to cook different types of food at different times and temperatures. The oven comprises a housing and support means located in the housing for supporting the food to be cooked. A lower electrical heating element is located below the support means. Two laterally spaced apart upper electrical heating elements are supported above the support means and the food to be cooked. Means is provided for supplying electrical power to the lower electrical heating element and to the two upper electrical heating elements. Control means including a programmable controller is provided for controlling electrical power applied to the lower heating element and to the two upper electrical heating elements to allow electrical power to be applied to each of the two upper electrical heating elements simultaneously or separately.

Brief Description of the Oven of U.S. Pat. No. 6,355,914

In U.S. Pat. No. 6,355,914, the controller of the oven is programmed to contain a plurality of menus with each menu being assigned given cooking time and power level parameters for controlling electrical power to the upper heating elements for operating these heating elements either separately or together. A first selection means is provided for selecting any one of the menus for cooking purposes and zone selection means is provided for selecting the desired cooking zone left, right or a combination of the left and right zones. After the cooking process is completed, the controller automatically defaults back to a given menu, for example menu one. Thus the procedure is reduced to two steps to change to a new cooking procedure i.e. selecting the desired menu and then selecting the desired cooking zone, left, right, or a combination of the left and right cooking zones.

In the oven disclosed, a temperature sensor located in the oven has an output which is coupled to the programmable controller. The controller uses this output to control the lower heating element to maintain a set point temperature in the oven of i.e. 550° F. It has been found, however, that actuation of the upper left or right broilers or both of them may result in the oven temperature continuing to rise if food items are cooked one after another with each uncooked item inserted into the oven immediately after the cooked one is removed. For example the temperature may rise to a level of 650° F. or higher which may burn the pizzas or other food being cooked.

SUMMARY OF THE INVENTION

In accordance with the invention, a second broiler temperature setting is provided which is higher than the set point temperature. The second broiler temperature setting may be i.e. 585° F. When any of the upper heating elements is actuated and the temperature in the oven rises above the higher temperature setting, the upper heating elements will be disabled or the power thereto reduced until the temperature in the oven falls below the upper temperature setting. This prevents the oven from getting too hot and burning the food.

The process may be employed for ovens that employ a single upper heating element or more than two upper heating elements whether the heating elements are electrical resistance heating elements or other types such as microwave devices.

BRIEF DESCRIPTION OF THE DRAWINGS

FIG. 8 are timing diagrams of the voltages applied to the two upper cooking elements of the oven.

DESCRIPTION OF THE PREFERRED EMBODIMENTS

Figure 1:
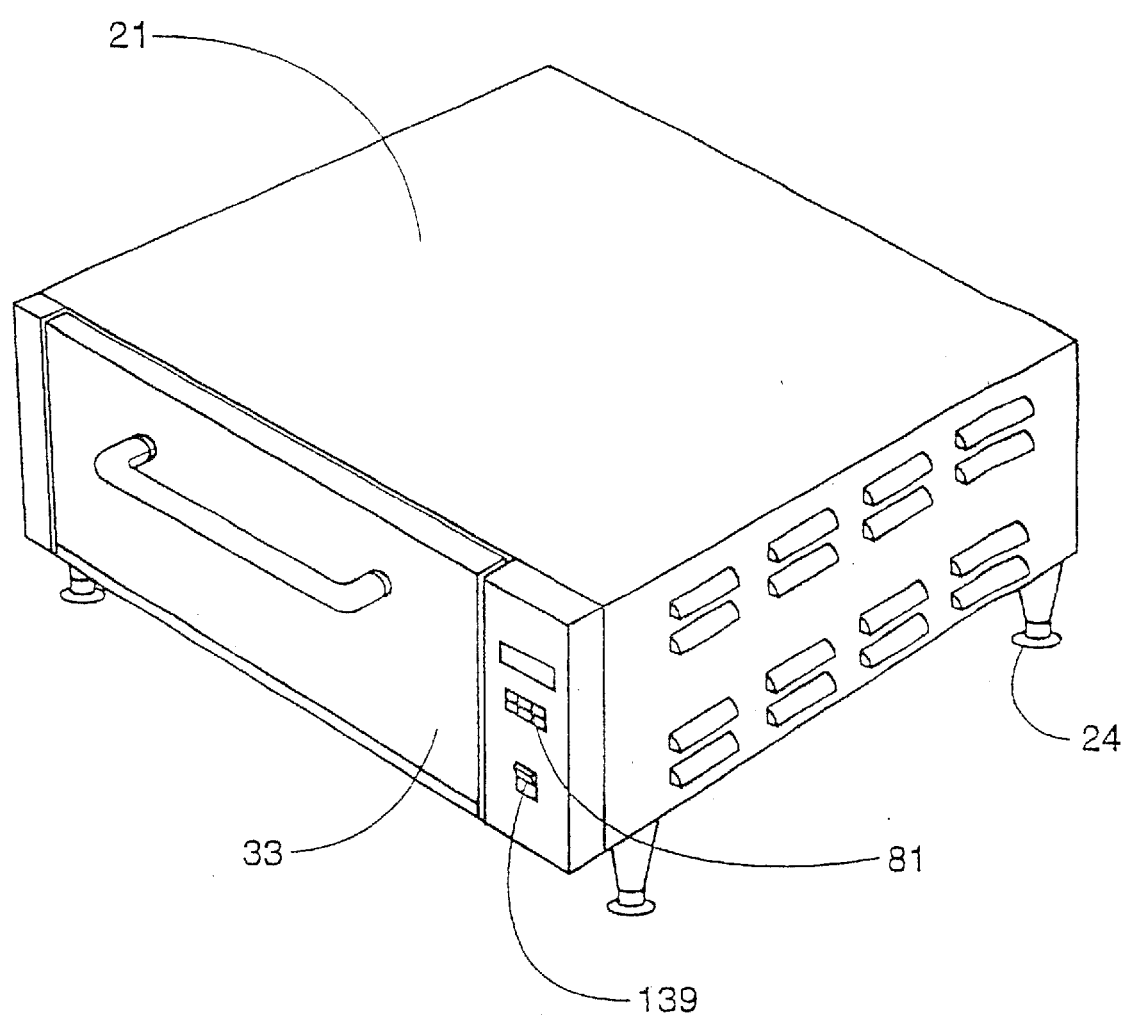
FIG. 1 is an isometric view of the oven used in the invention.
Figure 3:
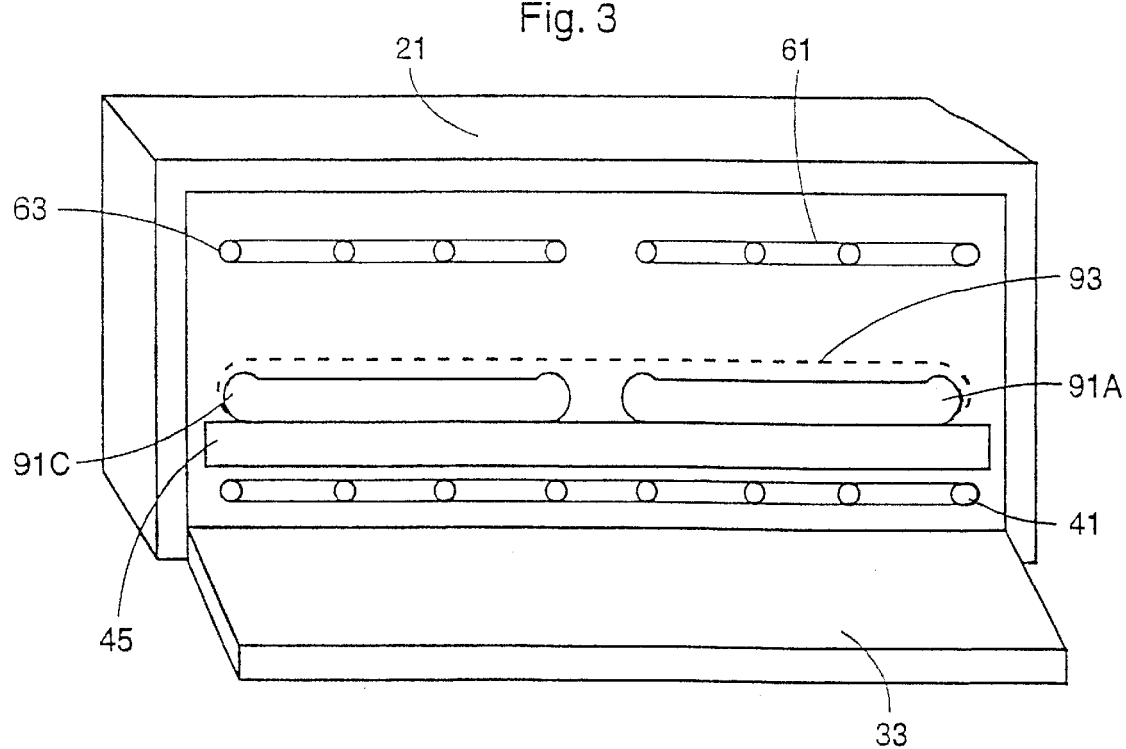
FIG. 3 is a front view of the oven of FIG. 1 with its door in an open position.

Referring now to the drawings, the oven is identified at 21. It comprises a housing or cabinet formed by a bottom wall 23, supported by legs 24, two side walls 25 and 27 connected to a rear wall 29, a rear wall 31 and a front door 33 which has its lower end pivotally coupled to the front edge of the bottom wall 23 such that the door 33 can move between a closed position as shown in FIG. 1 to an open position as shown in FIG. 3. The walls 25, 27, and 31, have vent apertures 25A, 27A and 31A respectively. A rectangular frame member 35 having inner liner walls 35A, 35B, and 35C is coupled to and supported by the bottom wall 23. An electrical coil or electrical resistance heating element 41 is supported by the bottom wall 23. Walls 35A and 35B have dimple spacers 43 for supporting a ceramic or brick food supporting member 45 above the heating element 41. A rectangular metal frame 51 having a central opening is provided for supporting two metal electrical coils or electrical resistance heating elements 61 and 63 above the food supported by the member 45. The frame 51 has inner side wall liners 51A, 51B, and 51C which engage and are supported by liners 35A, 35B, and 35C, respectively to support the frame at the desired height above the support member 45.

A baffle 71 having an opening 73 is supported behind the brick 45 and spaced from the rear wall 31. Supported in the space between the baffle 71 and the rear wall 31 is an electric motor 75 for operating a fan 77.

Figure 2:
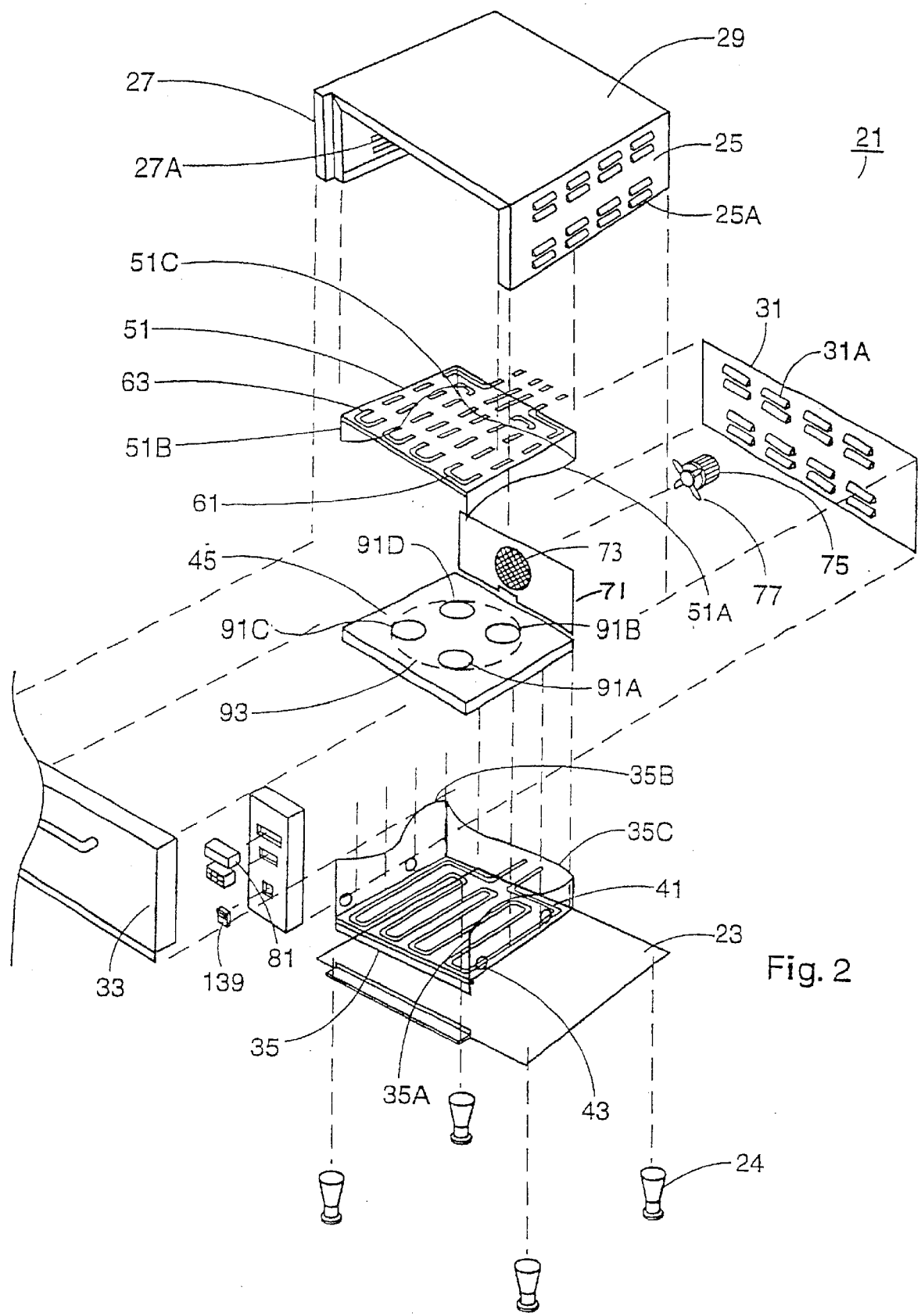
FIG. 2 is an exploded view of the oven of FIG. 1.

A controller 81 in an electrical system as shown in FIGS. 4–8 is provided for operating the three electrical heating elements 41, 61, and 63 for cooking the food supported by the brick member 45. The brick member 45 may support two small pizzas 91A and 91B under the heating element 61 and two small pizzas 91C and 91D under the heating element 63 or one large pizza 93 under both heating elements 61 and 63 as shown in FIGS. 2 and 3. The controller 81 and a thermocouple 183 are employed to apply electrical power to the lower heating element 41 to heat the brick 45 and hence interior of the oven to the desired temperature and to maintain the desired temperature in the oven. The fan 77 aids in the heating procedure in that it draws hot air over the food being cooked. The controller 81 is programmed in that it may operate the upper heating elements 61 and 63 either separately or simultaneously each for a given time period to provide two separate upper heating or cooking zones or a single upper heating or cooking zone. In this respect the controller 81 may operate to energize only the right upper heating element 61 for a given time period to cook one or two small pizzas under the element 61 or it may operate to energize only the left upper heating element 63 for a given time period to cook one or two small pizzas under the element 63, as shown in FIGS. 8A and 8B. It can energize element 61 starting at a given time and then energize element 63 starting at a different time to start the cooking period for a small pizza under element 61 and then at a delayed time to start the cooking period for a small pizza under element 63, as shown in FIGS. 8A, 8C, and 8D. The controller 81 also can energize both elements 61 and 63 beginning at the same starting time for given cooking period to cook a large pizza under both of the heating elements 61 and 63, as shown in FIG. 8E. During each cooking time period that elements 61 and/or 63 are energized, the electrical power applied to each element preferably will be at a high level for a short initial period and then drop to a lower level for the remainder of the time period. The controller 81 is of the type manufactured by Watlow Controls of Winoma, Minn. and is identified as the Mini Chef 2000. It has six buttons or keys A, B, C, D, E, and F and a five-digit seven segment numeric LED display 83. It also has one LED indicator light LA, LB, LC, LD, LE, LF for each key or button and LED indicator lights LG and LH for indicating the on/off state of the heating elements 63 and 61 respectively. The controller 81 also has a sensor input 91 and three switched D.C. signal outputs 101, 103, and 105 and an output 109 (audible alarm output). The controller also has a microchip EEPROM (Electronic Erasable Programmable Read Only Memory).

Software has been programmed into the EEPROM of controller 81 to allow each cooking time of the elements 61 and/or 63 to be of a given duration and the percentage of power applied to the elements 61 and 63 to be 100% initially and at a lower percentage i.e. 50% power the remainder of the cooking time of elements 61 and 63. The total cooking time of each of the elements 61 and/or 63 may be 2½ minutes. The cooking times and electrical power applied to the two elements 61 and 63 may be programmed to different values, as shown by the dotted lines in FIGS. 8A–8E.

The inputs and outputs of the controller 81 are used as follows. Sensor input 91 is used to sense the temperature of the brick heater 45. Power input 95 is used to apply power to the controller 81. Output 101 is used to control the bottom element 41. Output 105 is used to control the upper left element 63. Output 107 is used to control the upper right element 61. Output 109 is used to control a remote buzzer. Outputs 101, 105 and 107 are voltages having values of 3–32 volts D.C. The output 109 is equal to about 5 volts D.C.

The controller 81 can be operated in an operations mode and in a configuration or edit mode. In an earlier operations mode, the buttons of the controller will operate as shown in conjunction with FIG. 6. In an earlier edit mode, the buttons will operate as shown in conjunction with FIG. 7.

In the operation mode, the controller 81 operates in a preset or pre-programmed manner as follows. During normal operations, a press of key A will initiate cooking in the left side of the oven. During cooking operations, by pressing and holding, this key will reset the cooking cycle for the left side. During normal operations, a press of key B will initiate cooking in the entire oven. During cooking operations, by pressing and holding this key will reset the cooking cycle for the entire oven. During normal operations, a press of key C will initiate cooking in the right side of the oven. During cooking operations, by pressing and holding this key will reset the cooking cycle for the right side.

A press of button D will add 10 seconds (100% power) to the cooking time of element 63, after the original cooking time of element 63 is complete. A press of button F will add 10 seconds (100% power) to the cooking time of element 61 after the original cooking time of element 61 is complete. If a large profile is being cooked, a press of either "D" or "F" buttons will add 10 second (at 100% power) of cooking time of elements 61 and 63 after the original cooking time of elements 61 and 63 is complete.

In one embodiment, the cooking time for elements 61 and/or 63 may be 2.5 minutes. As mentioned previously, the EEPROM or microchip of the controller 81 has been programmed such that for the preset cooking time of elements 61 and/or 63, the controller 81 controls the relays 151 and 171 to allow 100% electrical power to be applied to the heating elements 63 and 61 initially from the 220 volt leads 121, 123 for example for about 30 seconds and then for the remaining 2 minutes, less than 100% (i.e. 50%) electrical power to be applied thereto.

Figure 4:
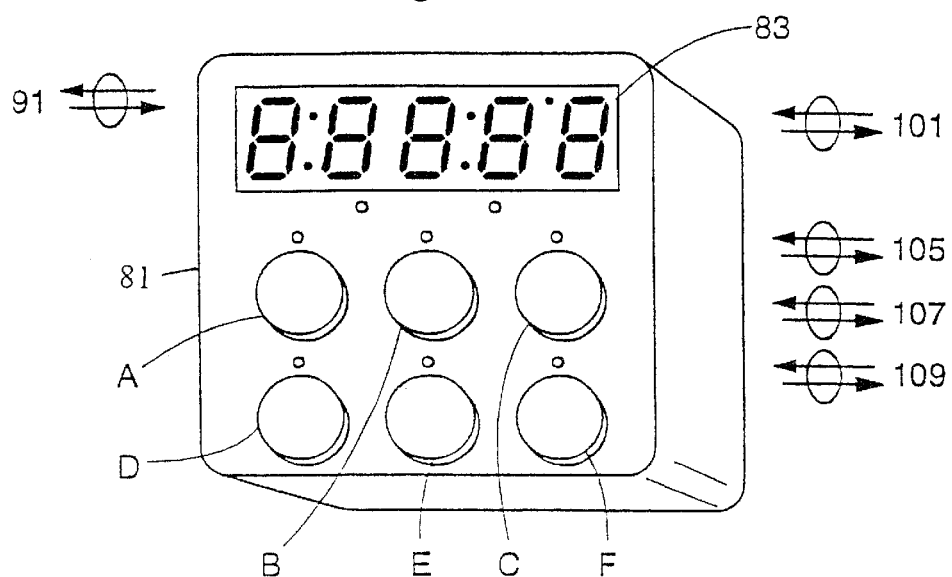
FIG. 4 is a block diagram of the controller used in conjunction with the oven of FIGS. 1–3.
Figure 5:
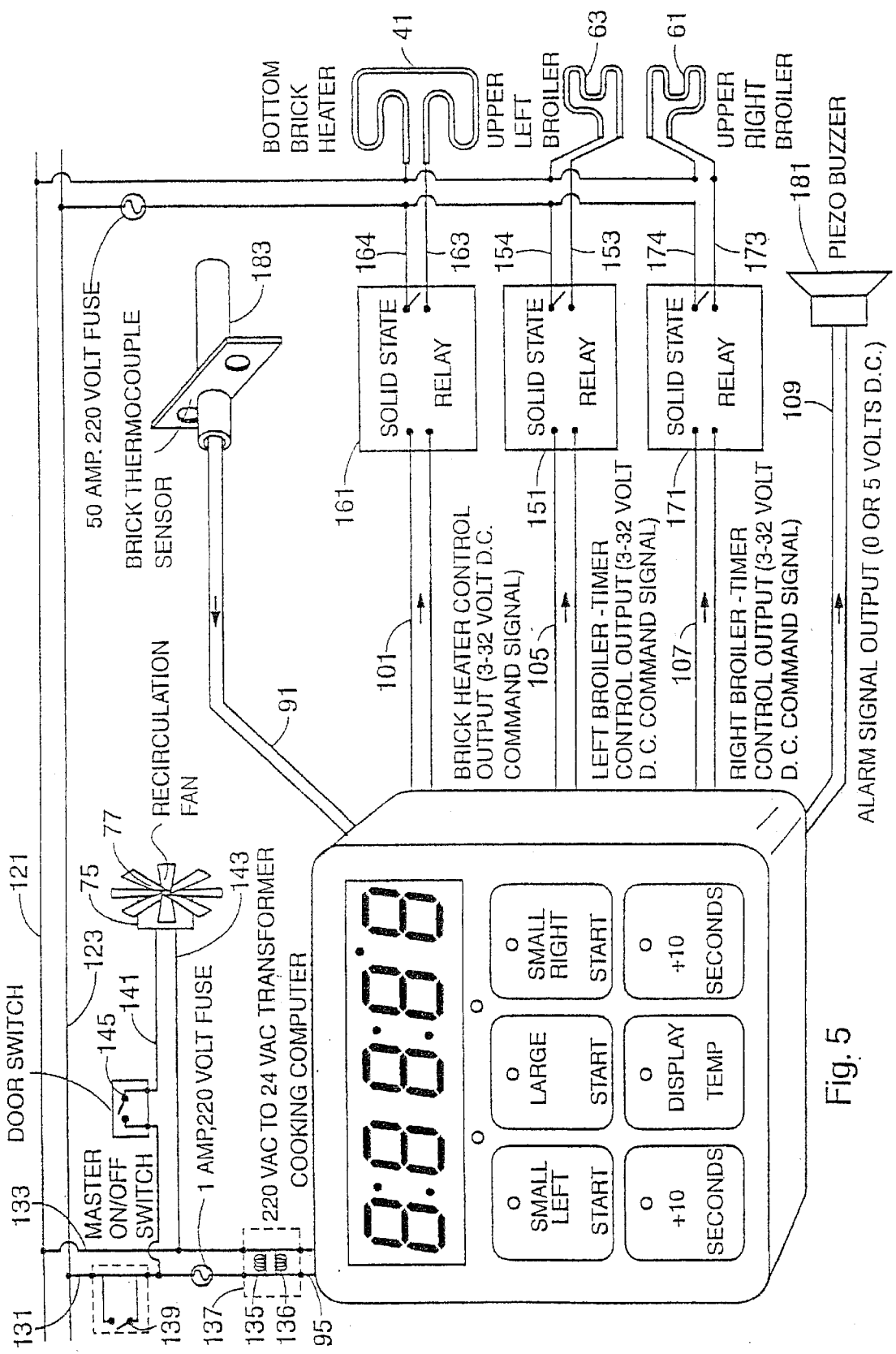
FIG. 5 is a schematic of the system used in conjunction with the oven and controller of FIGS. 1–4.
Figure 6:
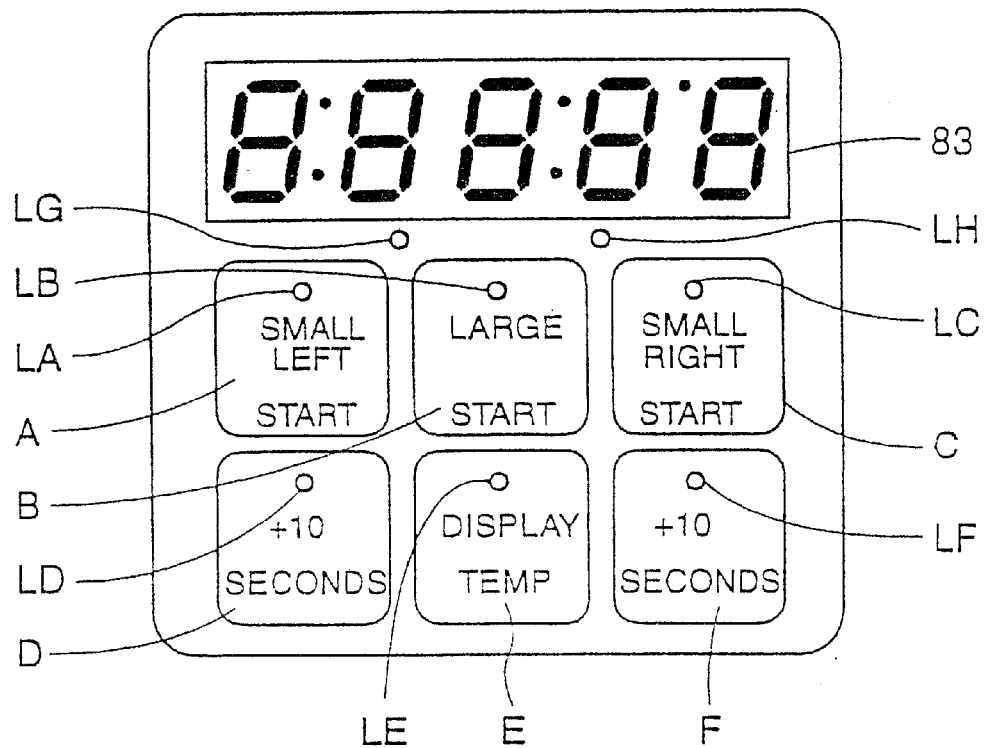
FIG. 6 is a front view of the controller in its operational mode.
Figure 7:
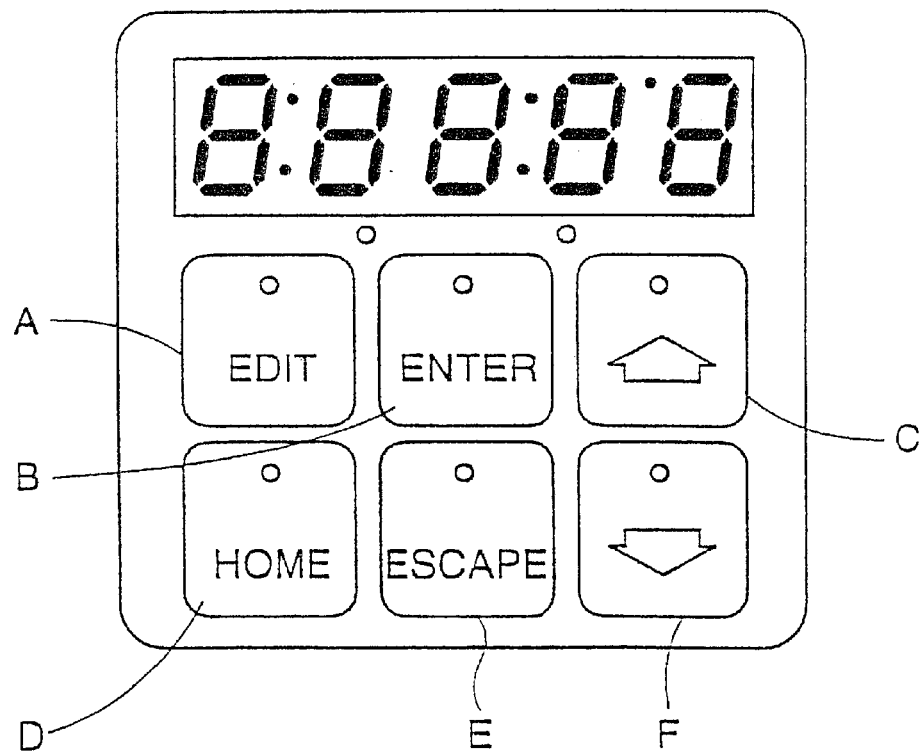
FIG. 7 is a front view of the controller in its set up mode.

Referring now to FIGS. 4 and 5 there will be described the electrical system for operating the oven of the invention. Leads 121 and 123 carry 220 volts A.C.. Leads 131 and 133 are coupled to leads 121 and 123 and include the primary 135 of a step down transformer 137. Lead 131 includes a master on/off switch 139. Coupled to leads 131 and 133 are leads 141 and 143 which are coupled to the motor 75 which operates the fan 77. The door switch 145 is coupled to lead 141. The secondary 136 of the transformer 137 is coupled to the controller 81 by input 95. Solid state relays 151, 161, and 171 are coupled to leads 121 and 123 by way of leads 153, 154; 163, 164; and 173, 174, respectively. The electrical heating elements 41, 61, and 63 are coupled to leads 163, 173, and 153 respectively. Controller outputs 101, 105, and 107 are coupled to the relays 161, 151, and 171 respectively. Lead 109 is coupled to a buzzer 181. A thermocouple sensor 183 is coupled by lead 91 to the controller 81.

When switch 139 is closed, electrical power is applied to motor fan leads 141 and 143 and to the transformer 137 the latter of which applies a lower A.C. voltage to the controller 81. The controller 81 applies an output by way of lead 101 to the relay 161 which allows current flow through the element 41 sufficient to achieve the desired preset oven temperature i.e. 550° F. The thermocouple 183 is located in the oven and senses the temperature. If the temperature rises or falls above or below the preset temperature, a signal is applied by lead 91 to the controller 81 to cause a control voltage to be applied to the relay 161 by way of output 101 to lower or increase the current flow through the electrical heating element 41.

When buttons A, B, and C are pressed, the controller 81 sends a voltage to relays 151, 171 by way of outputs 105, 107 to allow the desired current to flow through the heating elements 63, 61 to obtain the desired cooking time periods and to obtain the desired percentages of power during the two stages of the cooking time periods. The outputs on leads 105 and 107 have time durations equal to the desired cooking time periods, as illustrated in FIG. 8. The voltage outputs on leads 105 and 107 also are represented by the diagrams of FIG. 8. After the cooking periods of elements 63 and 61 are completed, buttons D and F may be pressed, to control the relays 151 and 171 for an additional 10 seconds to allow current flow through the elements 63 and 61. The current flow through the relays 151, 161, and 171 and hence through the elements 63, 41, and 61 thus is controlled by the outputs on leads 105, 101, and 107 respectively from the controller 81.

As mentioned above, the controller 81 can be operated in a configuration or edit mode to allow the cooking process to be reprogrammed and stored or to allow another menu to be programmed and stored in the controller for cooking another type of food for example, calzone, bread, etc.

In an earlier configuration mode, as disclosed in U.S. Pat. No. 6,114,663 button A controls edit, button B controls enter, button C controls the scroll up sequence, button D controls home, button E controls escape, and button F controls the scroll down sequence. In order to program another menu, the following procedure is followed. Buttons C and F are pushed together for 3 seconds and released. A second menu page appears on the screen which allows the operator to set cook times and percent power for the left side (small pizza), (both broilers are on simultaneously) large pizza and the right side (small pizza). Next the two left bottom buttons D and E are held down for approximately six seconds. This brings up the set up menu pages which can be sequentially viewed by pressing the down arrow button. In order to enter the set up menu page, the edit key is pressed while the desired page is displayed. The down arrow button F is pushed in order to scroll through each category. If the operator wants to change a parameter, Edit is selected; the buttons C or F are pressed to scroll up or down and then Enter is selected. The operator can then move on to the next category. If no changes are desired for any other categories, Enter is hit twice to get out of Setup.

Referring to Table I, the left column identifies the parameters to be changed for each category, the middle column indicates the parameters to be selected as they are scrolled through and the right column defines in more detail the parameters. Lines 3–8 refer to broilers 61 and 63 operating simultaneously and lines 9–13 refer to the selected broiler 61 or 63 operating separately. Referring to lines 3–8, line 3 allows the operator to select the percent of power initially; line 4 allows the operator to select the percent of power at the second step or phase; line 5 allows the operator to select the total time on for the broiler; line 6 allows the operator to select the initial time before the controller 81 switches to the second phase; and line 8 indicates the firing sequence. It allows the operator to cause the controller 81 to fire the selected broiler at the beginning, middle, or end of the cook time. The parameters to be selected or changed in lines 9–13 correspond with those of lines 3–6, however, they apply only to element 61 or element 63 depending on which one is being programmed. This can be accomplished by scrolling to the next function i.e. from small broiler right to small broiler left.

TABLE I

| 1. | SEtPT | 550° F. | (Setpoint) |
|---|---|---|---|
| 2. | Cook Time | 2:30 | (Total Cooking Time) |
| 3. | LbP1 | 100 | (Large broiler, % power Initial) |
| 4. | LbP2 | 60 | (Large broiler, % power Second Step) |
| 5. | Lb tt | 1:30 | (Larger broiler, Total Time On) |
| 6. | Lb St | :30 | (Large broiler, Switch Time: Activates 2nd Step. How long before controller switches to 2nd phase.) |
| 7. | Cook Time | 2:30 | (Total Cooking Time) |
| 8. | LFirE | ENd, bEg, dEL | (Large broiler, Firing Sequence) |
| 9. | SbP1 | 100 | (Small broiler, % power Initial) |
| 10. | SbP2 | 60 | (Small broiler, % power Second Step) |
| 11. | Sb tt | 2:10 | (Small broiler, Total Time On) |
| 12. | Sb St | :01 | (Small broiler, Switch Time) |
| 13. | SFirE | End, bEg, dEL | (Small broiler, Firing Sequence) |

There now will be described the preferred menu selection process.

Figure 9A:
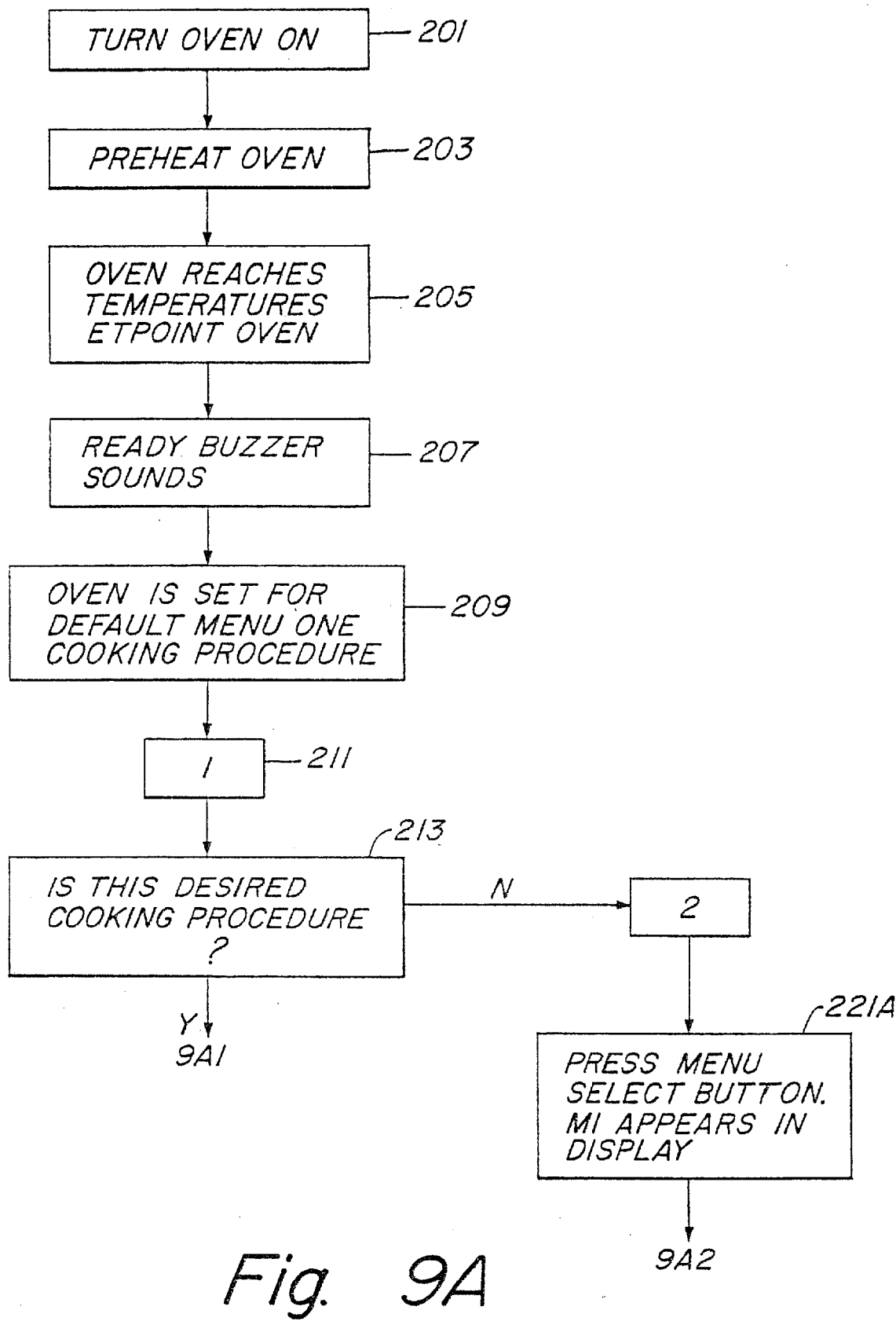
FIGS. 9A and 9B is a flow diagram of the oven operating procedure.
Figure 9B:
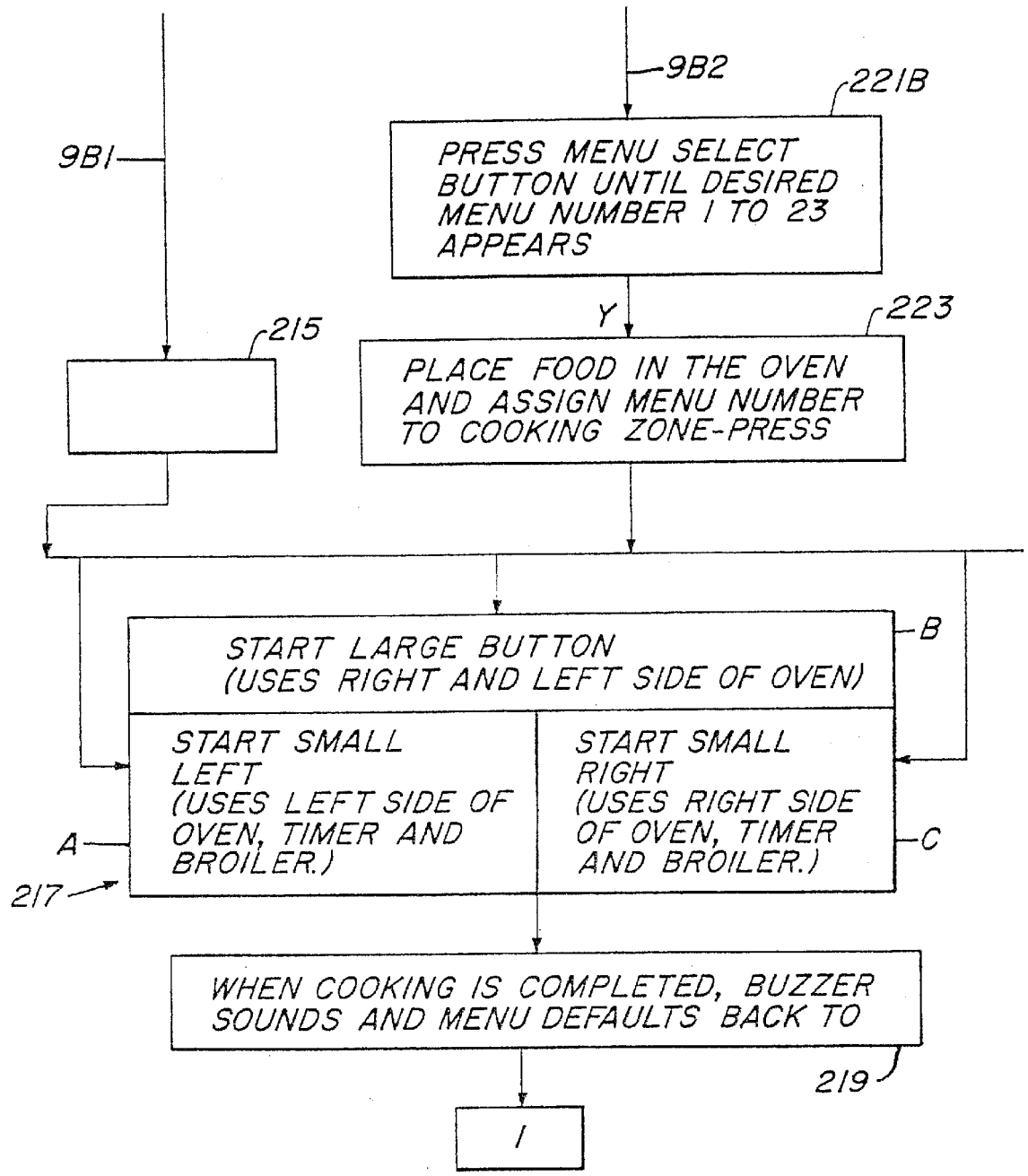

The system uses the same hardware as disclosed in U.S. Pat. No. 6,114,663, but some of the programming and procedures have been changed to significantly enhance the speed and efficiency of the menu selection process. Referring now to FIGS. 9A and 9B there will be described the procedure for operating the oven. In FIGS. 9A and 9B lines 9A1 and 9A2 connect with lines 9B1 and 9B2 respectively. In one embodiment, there may be 23 menus stored or programmed into the EEPROM of the controller 81. The controller 81 has been designed and programmed such that by pressing the button E, the menus can be sequentially retrieved and displayed to select the desired menu and then the desired cooking zone may be selected by pressing either button A, C, or B to cook in the left, right, or large cooking zone. After cooking has been completed, the system defaults back to a given menu which may be menu one. In the operating procedure, the oven is turned on at 201 and preheated at 203. When the oven reaches the desired temperature as sensed at 205 the ready buzzer sounds at 207 and at 209 the oven is set for default menu one cooking procedure which is displayed at 211. At 213 a decision is made as to whether the displayed menu is the desired cooking procedure. If it is, the operator places the food in the oven at 215 and then at 217, pushes either of the buttons A, C, or B to actuate the left, or right heating elements 61, 63 or to actuate both heating elements simultaneously. At 219, when the cooking procedure is completed, the buzzer sounds and the system defaults back to menu one.

At 213, if it is determined that the default menu is not the desired cooking procedure, the menu select button E is pressed at 221A, 221B until the desired menu is displayed. The operator then places the food in the oven at 223 and at 217, pushes either of the buttons A, C, or B to actuate the left or right heating element 61, 63 or to actuate both heating elements simultaneously. At 219, when the cooking procedure is completed, the buzzer sounds and the system defaults back to menu one.

Figure 10:
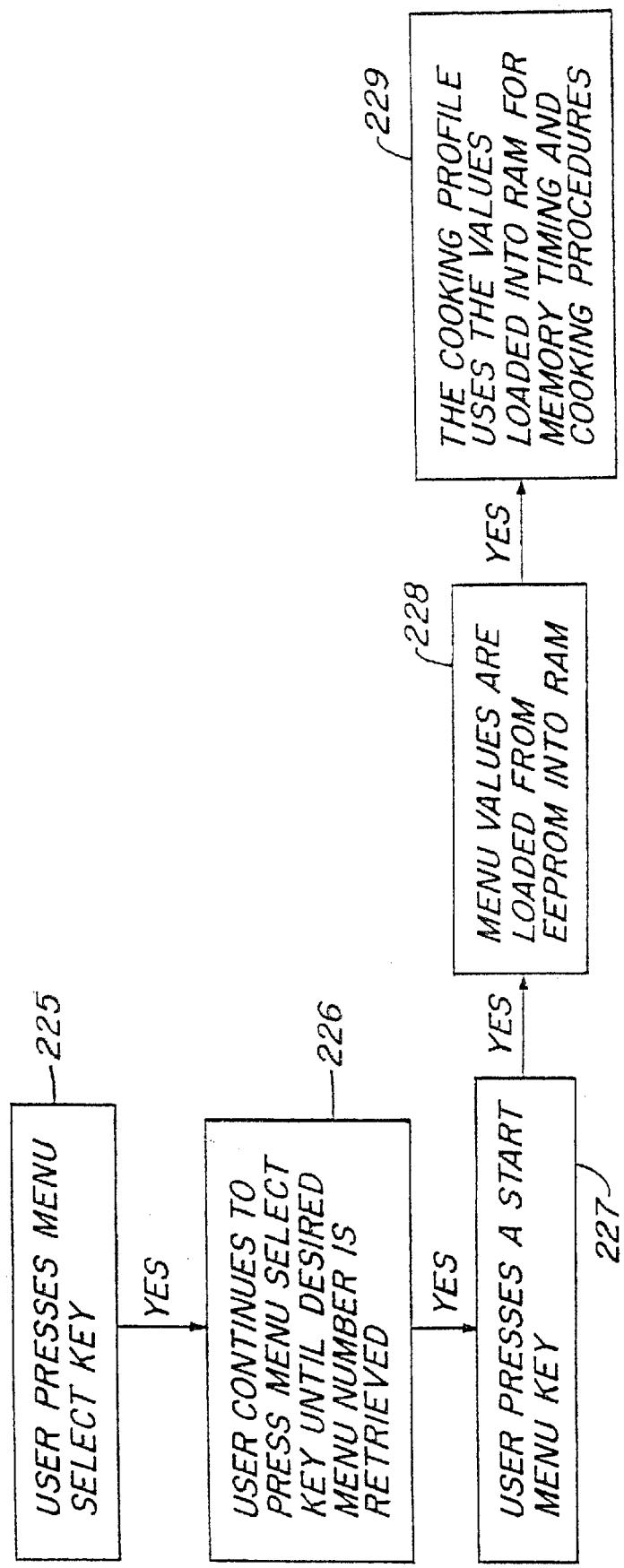
FIG. 10 is a flow diagram of the selection process.

Referring to FIG. 10, the menus are stored in the memory of the EEPROM (Electronic Erasable Programmable Read Only Memory) of the controller 81 which also includes a RAM (Random Access Memory). When the operator presses the Menu Select Key at 225 the controller will begin the menu selection process. The first valid program will be displayed (for example, Menu One). Additional presses of the Menu Select Key at 226 will cause the system to continuously loop through all of valid menus. Once the desired menu number is selected, the operator at 227 presses a Start menu key. Once the Start Small Left, Start Large, or Start Small Right Keys are pressed, the cooking profile for the corresponding menu number is loaded from the EEPROM into RAM at 228. At 229, the cooking profile uses values loaded into RAM for memory timing and cooking procedures.

A detailed description of the controller 81 and its operation in the preferred embodiment of its inputs and outputs now will be described. For operation purposes Tables 2–6 describe the Power-up, Preheat, Cook, Parameter Select, and Parameter Edit States respectively.

TABLE 2

Power-up State

| | |
|---|---|
| Sensor Input 91 — temperature sensor | The temperature sensor (Sensor Input 91) will always read temperature. |
| Output 101 — brick heater | The brick heater (Output 101) will be disabled. |
| Output 105 — left broiler | The left broiler (Output 105) will be disabled. |
| Output 107 — right broiler | The right broiler (Output 107) will be disabled. |
| Output 109 — audible | The audible (Output 109) will be disabled. |

TABLE 3

Preheat State

| | |
|---|---|
| Sensor Input 91 - temperature sensor | The temperature sensor (Sensor Input 101) will always read temperature. |
| Output 101 - brick heater | If a system error condition exists, the brick heater (Output 101) will be continuously off. Else the brick heater (Output 101) will be enabled to control heat to the programmed preheat setpoint (PreHt parameter in the Equipment Type Submenu). |
| Output 105 - left broiler | The left broiler (Output 105) will be disabled. |
| Output 107 - right broiler | The right broiler (Output 107) will be disabled. |
| Output 109 - audible | If the temperature sensor (Sensor Input 91) value has become greater than or equal to the programmed preheat setpoint (Preht parameter in the Equipment Type Submenu), the audible (Output 109) will turn on steady for 3 seconds. Else if the Chirp parameter in the Setup Submenu is set to Yes, the audible (Output 109) will briefly turn on (chirp) whenever a valid keypress is made. Else the audible (Output 109) is continuously off. |

TABLE 4

Cook State

| | |
|---|---|
| Sensor Input 91 - temperature sensor | The temperature sensor (Sensor Input 91) will always read temperature. |
| Output 101 - brick heater | If a system error condition exists, the brick heater (Output 101) will be continuously off. Else the brick heater (Output 101) will be enabled to control heat to the programmed setpoint (Setpt parameter in the Equipment Type Submenu). |
| Output 105 - left broiler | See Broil Sequence |
| Output 107 - right broiler | See Broil Sequence |
| Output 109 - audible | If the Chirp parameter in the Setup Submenu is set to Yes, the audible (Output 109) will briefly turn on (chirp) whenever a valid keypress is made. Else see Timer Completion. |

TABLE 5

Parameter Select State

| | |
|---|---|
| Sensor Input 91 — temperature sensor | The temperature sensor (Sensor Input 91) will always read temperature. |
| Output 101 — brick heater | The brick heater (Output 101) will be disabled. |
| Output 105 — left broiler | The left broiler (Output 105) will be disabled. |
| Output 107 — right broiler | The right broiler (Output 107) will be disabled. |
| Output 109 — audible | The audible (Output 109) will be enabled. |

TABLE 6

Parameter Edit State

| | |
|---|---|
| Sensor Input 91 — temperature sensor | The temperature sensor (Sensor Input 91) will always read temperature. |
| Output 101 — brick heater | The brick heater (Output 101) will be disabled. |
| Output 105 — left broiler | The left broiler (Output 105) will be disabled. |
| Output 107 — right broiler | The right broiler (Output 107) will be disabled. |
| Output 109 — audible | The audible (Output 109) will be enabled. |

The definition of the keys are as follows:

Key A is defined as the Start Small Left key.

Key B is defined as the Start Large key.

Key C is defined as the Start Small Right key.

Key D is defined as the Fire Left Broiler key.

Key E is defined as the Menu Select key.

Key F is defined as the Fire Right Broiler key.

Start Menu Keys

The following group of keys are defined as the Start Menu keys:

The Start Small Left key (Key A).

The Start Large key (Key B).

The Start Small Right key (Key C).

Increment and Decrement Keys

The following group of keys are defined as the Increment and Decrement keys:

The Increment key (Key C).

The Decrement key (Key F).

Reference is made to Tables 7–11 for a description of the operation of the keys in their Power-up, Preheat, Cook, Parameter Select, and Parameter Edit States.

TABLE 7

Power-up State

| | |
|---|---|
| Key A - Start Small Left key | Any press of the Start Small Left key (Key A) will have no effect. |
| Key B - Start Large key | Any press of the Start Large key (Key B) will have no effect. |
| Key C - Start Small Right key | Any press of the Start Small Right key (Key C) will have no effect. |
| Key D - Fire Left Broiler key | Any press of the Fire Left Broiler key (Key D) will have no effect. |
| Key E - Menu Select key | Any press of the Menu Select key (Key E) will have no effect. |
| Key F - Fire Right Broiler key | Any press of the Fire Right Broiler key (Key F) will have no effect. |

TABLE 8

Preheat State

| | |
|---|---|
| Key A - Start Small Left key | Any press of the Start Small Left key (Key A) will have no effect. |
| Key B - Start Large key | Any press of the Start Large key (Key B) will have no effect. |
| Key C - Start Small Right key | Pressing and holding the Start Small Right key (Key C) and the Fire Right Broiler key (Key F) simultaneously for 3 seconds will put the unit into the Menu Programming Mode (Parameter Select State). |
| Key D - Fire Left Broiler key | Any press of the Fire Left Broiler key (Key D) will have no effect. |
| Key E - Menu Select key | Any press of the Menu Select key (Key E) will have no effect. |
| Key F - Fire Right Broiler key | Pressing and holding the Start Small Right key (Key C) and the Fire Right Broiler key (Key F) simultaneously for 3 seconds will put the unit into the Menu Programming Mode (Parameter Select State). |

TABLE 9

Cook State

| | |
|---|---|
| Key A - Start Small Left key | If the menu is in the process of a menu selection and the left side is available (no timing is occurring on the left side), a single press of the Start Small Left key (Key A) will begin the small left profile timing (see Menu Timing). Else if the small left profile is timing, pressing and holding the Start Small Left key (Key A) for 3 seconds will cancel the small left profile (see Menu Timing). Else if the small left profile has completed and requires acknowledgement, a single press of the Start Small Left key (Key A) will acknowledge the completed timer (see Menu Timing). Else if the small left profile is available (no timing is occurring on the left side), a single press of the Start Small Left key (Key A) will begin the small left profile timing (see Menu Timing) with the first valid programmed menu. |
| Key B - Start Large key | If the menu is in the process of a menu selection and the left and right sides are available (no timing is occurring on either side), a single press of the Start Large key (Key B) will begin the large profile timing (see Menu Timing). Else if the large profile is timing, pressing and holding the Start Large key (Key B) for 3 seconds will cancel the large profile (see Menu Timing). Else if the large profile has completed and requires acknowledgement, a single press of the Start Large key (Key B) will acknowledge the completed timer (see Menu Timing). Else if the large profile is available (no timing is occurring on either side), a single press of the Start Large key (Key B) will begin the large profile timing (see Menu Timing) with the first valid programmed menu. |

TABLE 9-continued

Cook State

| | |
|---|---|
| Key C - Start Small Right key | If the menu is in the process of a menu selection and the right side is available (no timing is occurring on the right side), a single press of the Start Small Right key (Key C) will begin the small right profile timing (see Menu Timing). Else if the small right profile is timing, pressing and holding the Start Small Right key (Key C) for 3 seconds will cancel the small right profile (see Menu Timing). Else if the small right profile has completed and requires acknowledgement, a single press of the Start Small Right key (Key C) will acknowledge the completed timer (see Menu Timing). Else if the small right profile is available (no timing is occurring on the right side), a single press of the Start Small Right key (Key C) will begin the small right profile timing (see Menu Timing) with the first valid programmed menu. Pressing and holding the Start Small Right key (Key C) and the Fire Right Broiler key (Key F) simultaneously for 3 seconds will put the unit into the Menu Programming Mode (Parameter Select State). |
| Key D - Fire Left Broiler key + 10 Seconds | If a large profile timer has just completed, a single press of the Fire Left Broiler key (Key D) within 60 seconds of the timer completion will turn the left broiler (Output 105) and the right broiler (Output 107) on for 10 seconds. The display will show a 10 second count down. Else if a small left profile timer has just completed, a single press of the Fire Left Broiler key (Key D) within 60 seconds of the timer completion will turn the left broiler (Output 105) on for 10 seconds. The display will show a 10 second count down. |
| Key E - Menu Select key | If the menu is not in the process of a menu selection, a single press of the Menu Select key (Key E) will begin the menu selection process (see Menu Timing). Else if the menu is in the process of a menu selection, a single press of the Menu Select key (Key E) will advance to the next valid menu. |
| Key F - Fire Right Broiler key + 10 Seconds | If a large profile timer has just completed, a single press of the Fire Right Broiler key (Key F) within 60 seconds of the timer completion will turn the left broiler (Output 105) and the right broiler (Output 107) on for 10 seconds. The display will show a 10 second count down. Else if a small right profile timer has just completed, a single press of the Fire Right Broiler key (Key F) within 60 seconds of the timer completion will turn the right broiler (Output 107) on for 10 seconds. Pressing and holding the Start Small Right key (Key C) and the Fire Right Broiler key (Key F) simultaneously for 3 seconds will put the unit into the Menu Programming Mode (Parameter Select State). The display will show a 10 second count down. |

TABLE 10

Parameter Select State

| | |
|---|---|
| Key A - Start Small Left key | If the current parameter is a submenu, a single press of the Start Small Left key (Key A) will enter the submenu. Else a single press of the Start Small Left key (Key A) will begin editing the parameter data. |
| Key B - Start Large key | If an upper level menu exists, a single press of the Start Large key (Key B) will back out a level. Else a single press of the Start Large key (Key B) will exit and return to the Power-up State. |
| Key C - Start Small Right key | A single press of the Start Small Right key (Key C) will step backward through the parameter list. |
| Key D - Fire Left Broiler key + 10 Seconds | Any press of the Fire Left Broiler key (Key D) will have no effect. |

TABLE 10-continued

Parameter Select State

| | |
|---|---|
| Key E - Menu Select key | Any press of the Menu Select key (Key E) will have no effect. |
| Key F - Fire Right Broiler key + 10 Seconds | A single press of the Fire Right Broiler key (Key F) will step forward through the parameter list. |

TABLE 11

Parameter Edit State

| | |
|---|---|
| Key A - Start Small Left key | Any press of the Start Small Left key (Key A) will have no effect. |
| Key B - Start Large key | A single press of the Start Large key (Key B) will accept the edit and return to the Parameter Select State. |
| Key C - Start Small Right key | A single press of the Start Small Right key (Key C) will increment the program data. |
| Key D - Fire Left Broiler key | Any press of the Fire Left Broiler key (Key D) will have no effect. |
| Key E - Menu Select key | A single press of the Menu Select key (Key E) will cancel the edit and return to the Parameter Select State. |
| Key F - Fire Right Broiler key | A single press of the Fire Right Broiler key (Key F) will decrement the program data. |

LEDs

Definitions

LED LA is defined as Small Left Timer LED and will be used to indicate timing status of the small left profile.

LED LB is defined as Large Timer LED and will be used to indicate timing status of the large profile.

LED LC is defined as Small Right Timer LED and will be used to indicate timing status of the small right profile.

LED LD is defined as a +10 second for the left side of the oven indicating when the +10 second key has been pressed.

LED LE is defined as Menu Select and will be used to indicate when menu select key is pressed.

LED LF is defined as a +10 second for the right side of the oven indicating when the +10 second key has been pressed.

LED LG is defined continuously as the Left Broil LED and will be used to indicate the left broiler (Output 105) status.

LED LH is defined as the Right Broil LED and will be used to indicate the right broiler (Output 107) status.

Increment and Decrement LEDs

The following group of LEDs are defined as the Increment and Decrement LEDs:

Increment LED (LED LC).
Decrement LED (LED LF).

Timer LEDs

The following group of LEDs are defined as the Timer LEDs:

Small Left Timer LED (LED LA).
Large Timer LED (LED LB).
Small Right Timer LED (LED LC).

References made to Tables 12–16 for a description of the operations of the LEDs in their Power-Up, Preheat, Cook, Parameter Select, and Parameter Edit States.

TABLE 12

Power-up State

| | |
|---|---|
| Timer LEDs | The Timer LEDs will be continuously off. |
| Left Broil LED — LED LG | The Left Broil LED (LED LG) will be continuously off. |
| Right Broil LED — LED LH | The Right Broil LED (LED LH) will be continuously off. |

TABLE 13

Preheat State

| | |
|---|---|
| Timer LEDs | The Timer LEDs will be continuously off. |
| Left Broil LED — LED LG | The Left Broil LED (LED LG) will be continuously off. |
| Right Broil LED — LED LH | The Right Broil LED (LED LH) will be continuously off. |

TABLE 14

Cook State

| | |
|---|---|
| Timer LEDs | If a profile timer is timing, the corresponding Timer LED will be continuously on. Else if a profile timer has just completed, the corresponding Timer LED will flash rapidly. Else the Timer LEDs will be continuously off. |
| Left Broil LED — LED LG | If the left broiler (Output 105) is on, the Left Broil LED (LED G) will be continuously on. Else the Left Broil LED (LED LG) will be continuously off. Else, if the Brint (Broiler Temperature Interlock) is reached, 585° F., broiler will turn continuously off until temperature drops below the Brint temperature. |
| Right Broil LED — LED LH | If the right broiler (Output 107) is on, the Right Broil LED (LED LH) will be continuously on. Else the Right Broil LED (LED LH) will be continuously off. Else, if the Brint (Broiler Temperature Interlock) is reached, 585° F., broiler will turn continuously off until temperature drops below the Brint temperature. |

TABLE 15

Parameter Select State

| | |
|---|---|
| Timer LEDs | The Timer LEDs will be used to indicate parameter selection status. |
| Left Broil LED — LED LG | The Left Broil LED (LED LG) will be continuously off. |
| Right Broil LED — LED LH | The Right Broil LED (LED LH) will be continuously off. |

TABLE 16

Parameter Edit State

| | |
|---|---|
| Timer LEDs | The Timer LEDs will be used to indicate parameter edit status. |
| Left Broil LED — LED LG | The Left Broil LED (LED LG) will be continuously off. |
| Right Broil LED — LED LH | The Right Broil LED (LED LH) will be continuously off. |

Segment Display

Power-up State

During the Power-up State, the segment display 83 will be blank ( ).

Preheat State

When the unit is in the Preheat State and the temperature sensor (Sensor Input 91) value is less than the preheat setpoint (Preht parameter in the Equipment Type Submenu), the segment display will briefly display pre-, Heat, and then the temperature sensor (Sensor Input 91) value in 5-degree increments.

When the unit is in the Preheat State and the temperature sensor (Sensor Input 91) value is greater than or equal to the preheat setpoint (Preht parameter in the Equipment Type Submenu), the segment display will display ready for 10 seconds and then display the sensed temperature (Sensor Input 91).

Cook State

If the unit is in the Cook State and large profile is timing, the segment display will be used to display the time for the large profile timer. If the large profile timer is timing, the segment display will show the time remaining for the profile (example, 3:42). If the profile timer has been completed, the segment display will flash double zero (00).

If the unit is in the Cook State and either of the small profiles are timing, the segment display will be split into a left side and a right side. If the profile timer is greater than or equal to 1 minute, the time remaining will display truncated minutes (example 3:42 would be displayed as 3.4) for the corresponding side. If the profile timer is less than 1 minute, the seconds remaining will be displayed (example 0:45 would be displayed as 45) for the corresponding side. If the profile timer has been completed, the corresponding side will flash double zero (00). If the timer is not running, the corresponding side will be blank ( ). Else if the unit is in the Cook State and no profile timing is occurring, the segment display will show the sensed temperature (Sensor Input 91) value.

If a menu selection is being made and no timing is occurring, the selected menu number will be displayed preceded by the letter "M" (ex. M 1 for menu 1). The menu selection will be rapidly flashing.

If a menu selection is being made and either of the small profiles are timing, the segment display will be split into a left side and a right side. If the small left side is available (no timing is occurring on the left side), the left side of the segment display will show the menu selection left justified (ex. 1 for menu 1 and 12 for menu 12). The menu selection will be rapidly flashing. If the small right side is available (no timing is occurring on the right side), the right side of the segment display will show the menu selection right justified (ex. 1 for menu 1 and 12 for menu 12). The menu selection will be rapidly flashing. If the temperature in the oven ever goes above 585° F., the broilers will shut off. When the temperature sensor value is less than or equal to the programmed broiler temperature interlock Brint, both broilers will be allowed to execute the broiler sequence.

Parameter Select State

When the unit is in the Parameter Select State and the display is a submenu, the segment display will display the submenu title. When the unit is in the Parameter Select State and the display is a prompt, the segment display will display the prompt title continuously alternating with the programmed data value.

Parameter Edit State

When the unit is in the Parameter Edit State, the segment display will display the data value being edited.

Table 17 describes the operation states. The left column describes the current state. The middle column defines the condition/argument. The right column defines the states to which the system will exit if the statements in the middle column are true.

TABLE 17

| Current | Condition/Argument | Exit |
| --- | --- | --- |
| Power-up State | Unit has remained in the Power-up State for 2 seconds | Preheat State |
| Preheat State | The temperature sensor (Sensor Input 91) value becomes greater than or equal to the PreHt value in the Equipment Type Submenu | Cook State |
| Preheat State | The Start Small Right key (Key C) and the Fire Right Broiler key (Key F) have been simultaneously pressed and held for 3 seconds. | Parameter Select State |
| Cook State | The Start Small Right key (Key C) and the Fire Right Broiler key (Key F) have been simultaneously pressed and held for 3 seconds. | Parameter Select State |
| Parameter Select State | There are no key presses for 2 minutes | Power-up State |
| Parameter Select State | The Enter key (Key B) is pressed and an upper level menu does not exist. | Power-up State |
| Parameter Select State | The Enter key (Key B) is pressed and an upper level menu exits. | Parameter Select State |
| Parameter Select State | The Edit key (Key A) is pressed and the prompt is a submenu. | Parameter Select State |
| Parameter Select State | The Edit key (Key A) is pressed and the prompt is not a submenu. | Parameter Edit State |
| Parameter Edit State | There are no key presses for 2 minutes. | Power-up State |
| Parameter Edit State | The Home key (Key D) is pressed and held for 2 seconds. | Power-up State |
| Parameter Edit State | The Enter key (Key B) or the Escape key (Key E) is pressed. | Parameter Select State |

Menu Timing

Starting the Menu Timer

From the Cook State, any valid programmed menu can begin timing. To run a menu, first press the Menu Select key (Key E). The first valid program (time not equal to 0) will be displayed (for example menu 1 will be displayed as M 1). Additional presses of the Menu Select key (Key E) will continuously loop through all the valid programs (time not equal to 0).

Once the desired menu is selected and the left and the right sides are available (no timing is occurring on either side), a single press of the Start Large key (Key B) will start both sides (large) timing with the selected menu.

Once the desired menu is selected and the left side is available (no timing is occurring on the left side), a single press of the Start Small Left key (Key A) will start the left side timing with the selected menu.

Once the desired menu is selected and the right side is available (not timing is occurring on the right side), a single press of the Start Small Right key (Key C) will start the right side timing with the selected menu.

Broil Sequence

Each menu has a programmed broil sequence. The broil sequence will begin and execute according to the active menus program parameters (see Broil Sequence). When the broil sequence is required by the large profile, both the left broiler (Output 105) and the right broiler (Output 107) will be used uniformly and simultaneously to execute the broil sequence. When the broil sequence is required by the small left profile, only the left broiler (Output 105) will be used to broil and is independent of the right broiler (Output 107). When the broil sequence is required by the small left profile, only the right broiler (Output 107) will be used to broil and is independent of the left broiler (Output 105).

No two profiles can use the same side to control a broil sequence. If a large profile is using the left broiler (Output 105) to control a broil sequence, the small left profile could not be started because the left broiler (Output 105) is already in use. Likewise, if a small left profile is using the left broiler (Output 105) to control a broil sequence, the large profile could not be started because the left broiler (Output 105) is already in use. If a large profile is using the right broiler (Output 107) to control a broil sequence, the small right profile could not be started because the right broiler (Output 107) is already in use. Likewise, if a small right profile is using the right broiler (Output 107) to control a broil sequence, the large profile could not be started because the right broiler (Output 107) is already in use.

Figure 11:
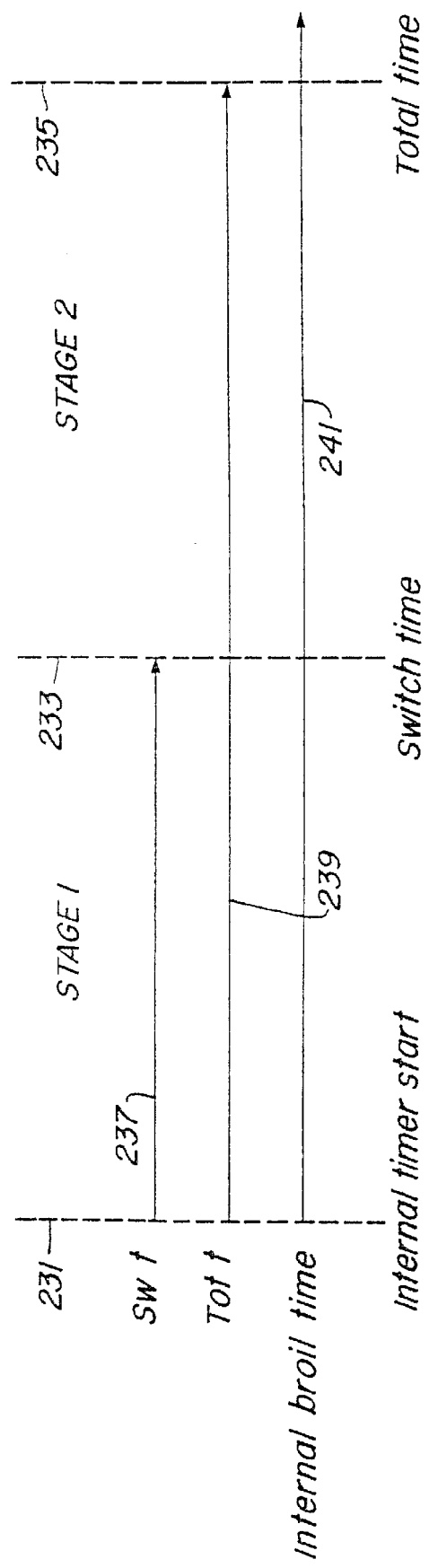
FIG. 11 illustrates the oven broiling stages.

The broil sequence consists of two stages. When the broil sequence is initiated, a broil timer separate from the profile will be started. The broil timer does NOT respond to temperature compensation (tconp parameter in the Setup Submenu) if enabled, and will strictly count seconds. While the broil timer is less than the sw t parameter for the active menu, the broil sequence is considered to be in the first stage. While the broil timer is greater than the sw t parameter for the active menu and less than the tot t parameter for the active menu, the broil sequence is considered to be in the second stage. FIG. 11 illustrates how the parameters determine the broiling stage.

In FIG. 11, lines 231, 233, and 235 represent internal timer start, switch time, and total time respectively. Line 237 represents the sw t parameter; line 239 represent tot t; and line 241 the time of an internal broiler timer respectively. The time between 231 and 233 is stage 1 and the time between 233 and 235 is stage 2.

If the sw t parameter of the active menu is set to 0 and the broil sequence is initiated, the broil sequence will start immediately in stage 2.

When the broil sequence is in the first stage, the Pow1 parameter for the active menu will be used to determine the on/off condition of the corresponding broiler(s). The Pow1 parameter for the active menu will be used to determine the percent output of a 1-second cycle time for the corresponding broiler(s). The corresponding broiler output(s) will then be cycled on and off as required by the percent requirement.

When the broil sequence is in the second stage, the Pow2 parameter for the active menu will be used to determine the on/off condition of the corresponding broiler(s). The Pow2 parameter for the active menu will be used to determine the percent output of a 1-second cycle time for the corresponding broiler(s). The corresponding broiler output(s) will then be cycled on and off as required by the percent requirement.

The broil sequence is initiated depending on the fire parameter for the active menu.

Figure 12:
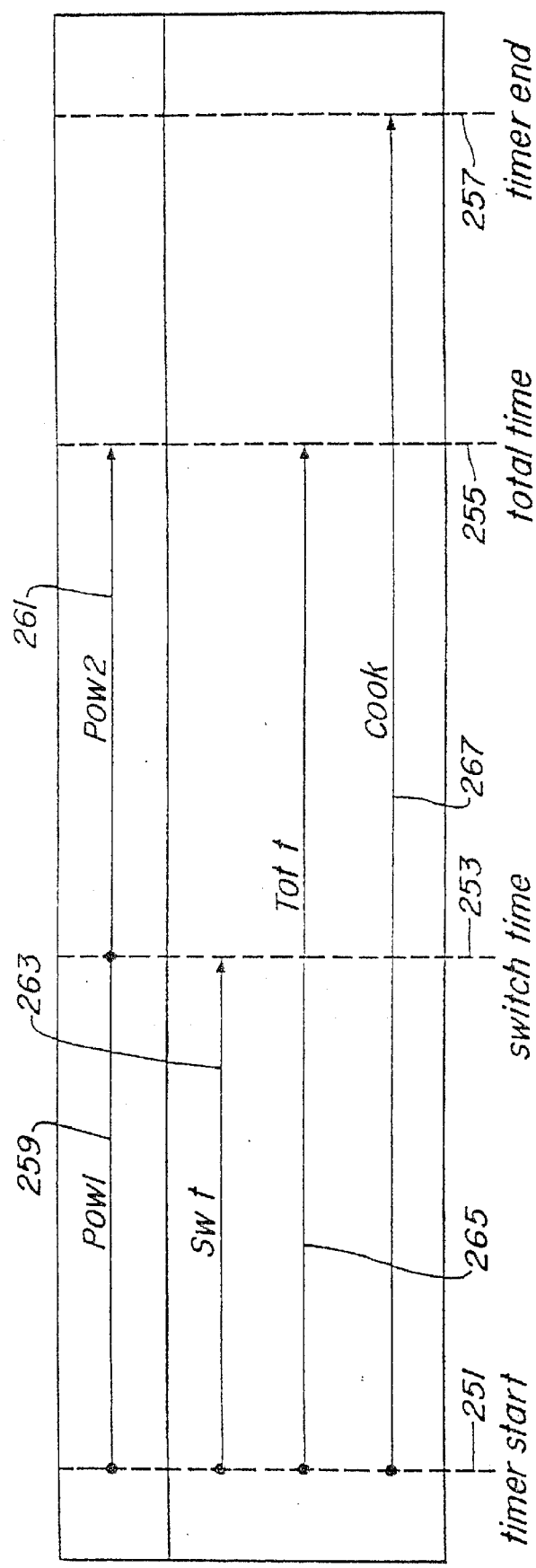
FIG. 12 illustrates a broiling sequence of the oven when the fire parameter is set to "beg".

Fire Parameter is Set to Beg:

When the fire parameter is set to beg, the broil sequence will be initiated when the menu timer is started. FIG. 12 illustrates a typical profile.

In FIG. 12, lines 251, 253, 255, and 257 represents timer start, switch time, total timer, and timer end respectively. Lines 259 and 261 represent Pow 1 and Pow 2 respectively. Lines 263, 265, and 267 represent Sw t, Tot t, and CooK respectively. If the temperature in the oven ever goes above 585° F., the broilers will shut off. When the temperature sensor value is less than or equal to the programmed broiler temperature interlock Brint, both broilers will be allowed to execute the broiler sequence.

Figure 13:
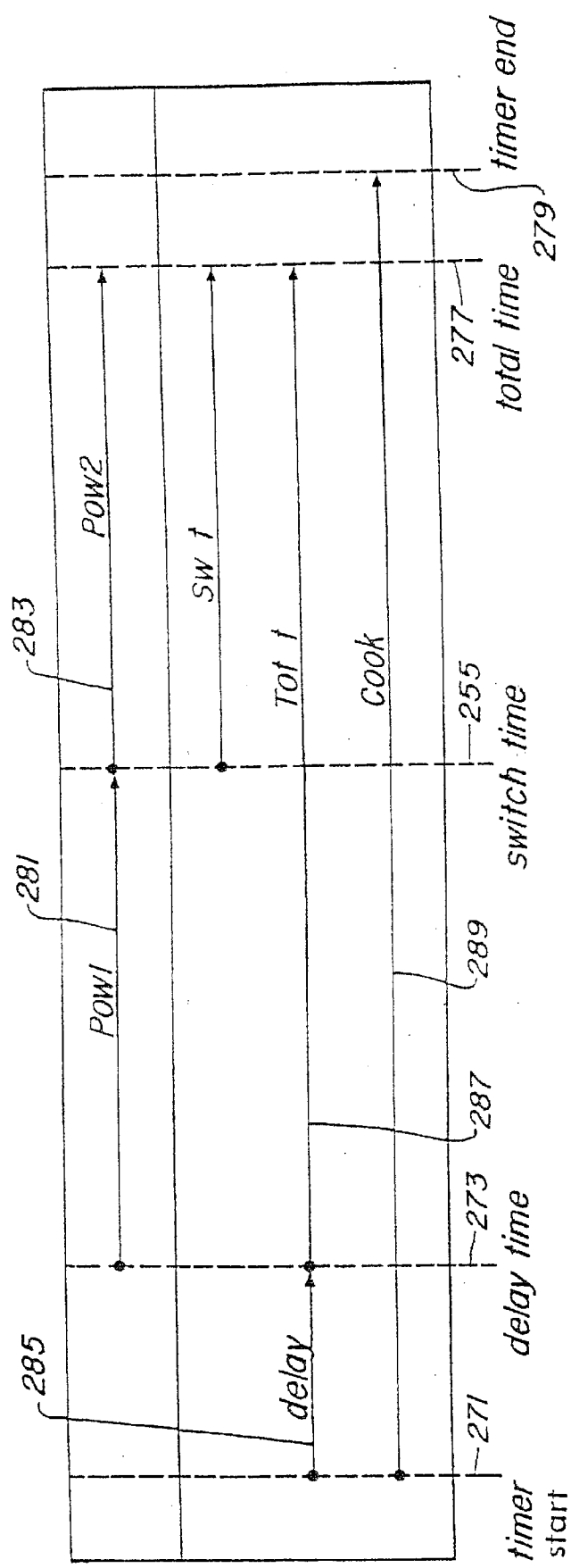
FIG. 13 illustrates a broiling sequence of the oven with a timed delay.

Fire Parameter is Set to Del:

When the fire parameter is set to deL, a delay will be used to initiate the broil sequence. After the menu timer starts, a timed delay begins. Once the timed delay of the delay menu parameter for the active menu has expired, the broil sequence will be initiated. Note that the timed delay does conform to the temperature compensation (tconp parameter in the Setup Submenu) if enabled. FIG. 13 illustrates a typical profile. If the temperature in the oven ever goes above 585° F., the broilers will shut off. When the temperature sensor value is less than or equal to the programmed broiler temperature interlock Brint, both broilers will be allowed to execute the broiler sequence.

In FIG. 13, lines 271, 273, 275, 277, and 279 represent timer start, delay time, switch time, total time, and timer end respectively. Lines 281 and 283 represents Pow1 and Pow2 respectively. Lines 285, 287, and 289 represents deLay, Tot t and CooK respectively.

Figure 14:
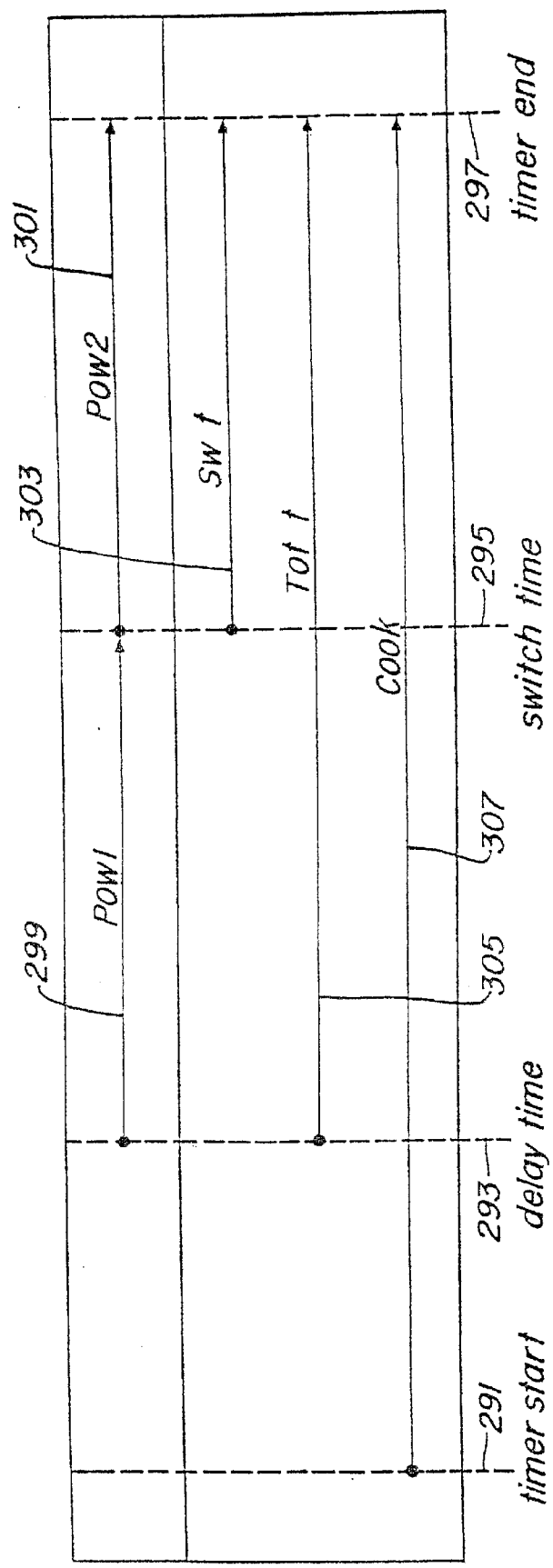
FIG. 14 illustrates a broiling sequence of the oven when the fire parameter is set to "end".

Fire Parameter is Set to End:

When the fire parameter is set to end, the broil sequence will be initiated when the menu timer time remaining becomes less than or equal to the tot t menu parameter for the active menu. FIG. 14 illustrates a typical profile. If the temperature in the oven ever goes above 585° F., the broilers will shut off. When the temperature sensor value is less than or equal to the programmed broiler temperature interlock Brint, both broilers will be allowed to execute the broiler sequence.

In FIG. 14, lines 291, 293, 295, and 297 represents timer start, delay time, switch time, and timer end respectively. Lines 299 and 301 represents Pow1 and Pow2 respectively. Lines 303, 305, 307 represent Sw t, Tot t, and CooK respectively.

Canceling the Menu Timer

To cancel a running menu timer on the small left side, press and hold the Start Small Left key (Key A) for 3 seconds. To cancel a running menu timer on the small right side, press and hold the Start Small Right key (Key C) for 3 seconds. To cancel a running menu timer on both sides (large), press and hold the Start Large key (Key B) for 3 seconds.

Timer Completion

The actions taken when a menu timer completes depends on the Sound parameter in the Equipment Type Submenu.

Sound Parameter is Set to 0:

If large profile timer completes, no audible (Output 109) will be sounded and the segment display will return to displaying the sensed temperature (Sensor Input 91) value. If a small profile completes and the other small profile timer is not timing, no audible (Output 109) will be sounded and the segment display will return to displaying the sensed temperature (Sensor Input 91) value. If a small profile completes and the other small profile timer is timing, no audible (Output 109) will be sounded and the segment display for the corresponding side will become blank ( ).

Sound Parameter is Set to 1, 2, or 3:

If a large profile timer completes, :00 will flash on the display and an audible (Output 109) will be sounded. The large profile timer can be acknowledged by pressing the Start Large key (Key B) or the unit times out in 1 to 20 seconds and returns to displaying the sensed temperature (Sensor Input 91) value.

If a small profile timer completes, and the other small profile timer is not timing, an audible (Output 109) will be sounded and the corresponding side will flash double zero (00). The small profile timer can be acknowledged by pressing the corresponding Start key or the unit times out in 1 to 20 seconds and returns to displaying the sensed temperature (Sensor Input 91) value.

If a small profile timer completes and the other small profile timer is timing, an audible (Output 109) will be sounded and the corresponding side will flash double zero (00). The small profile timer can be acknowledged by pressing the corresponding Start key or the unit times out in 1 to 20 seconds. Once the unit times out, the corresponding side will become blank ( ).

Sound Parameter is Set to 4 or 5:

If a large profile timer completes, :00 will flash on the display and an audible (Output 109) will be sounded. The large profile timer can be acknowledged by pressing the Start Large key (Key B). Once acknowledged, the segment display will show the sensed temperature (Sensor Input 91) value and the audible (Output 109) will be silenced.

If a small profile timer completes, and the other small profile timer is not timing, an audible (Output 109) will be sounded and the corresponding side will flash double zero (00). The small profile timer can be acknowledged by pressing the corresponding Start key. Once acknowledged, the segment display will show the sensed temperature (Sensor Input 91) value and the audible (Output 109) will be silenced.

If a small profile timer completes and the other small profile timer is timing, an audible (Output 109) will be sounded and the corresponding side will flash double zero (00). The small profile timer can be acknowledged by pressing the corresponding Start key. Once acknowledged, the corresponding side will become blank ( ) and the audible (Output 109) will be silenced.

Additional Broiling

After an automatic menu has been completed, the corresponding broiler(s) can be fired for an additional 10-seconds. If a large profile has just completed an automatic menu, pressing and holding either the Fire Left Broiler key (Key D) or the Fire Right Broiler key (Key F) for 1 second will turn the left broiler (Output 105) and the right broiler (Output 107) on for 10 seconds. If a small left profile or a small right profile has just completed an automatic menu, pressing and holding the Fire Left Broiler key (Key D) for 1 second will turn the left broiler (Output 105) on for 10 seconds. If a small left profile or a small right profile has just completed an automatic menu, pressing and holding the Fire Right Broiler key (Key F) for 1 second will turn the right broiler (Output 107) on for 10 seconds. Additionally, 10 seconds will be added to the corresponding profile timer and profile timing will begin again.

Programming a Menu Timer

To access the Automatic Menus, simultaneously press and hold Key C and Key F for 3 seconds from the operating display. This will enter the Menu Programming Mode. Using the Key C and Key F (Arrow UP & DOWN Keys), select an Automatic Menu for editing and press the Edit key (Key A). The following parameter and values are in the Automatic Menus.

There are 23 Automatic Menus. Table 18 discloses a grouped parameter list of one Automatic Menu.

TABLE 18

| Prompt | Description | Values | | Visibility |
|---|---|---|---|---|
| CooK | Time for cooking | Range: | 0 minutes, 0 seconds to 59 minutes, 59 seconds | Always visible. |
| | | Default: | 0 | |
| FirE | Broiler fire initiation | Range: | Beg, dE1, End | Always visible. |
| | | Default: | beg | |
| DELAY | Broiler fire time delay | Range: | 0 to the Time for cooking ('CooK) parameter | Fire is set to dE1. |
| | | Default: | 0 | |
| PoW1 | Initial broiler percent power | Range: | 0, 10, 20, 30, 40, 50, 60, 70, 80, 90, 100 | Always visible. |
| | | Default: | 0 | |

TABLE 18-continued

| Prompt | Description | Values | | Visibility |
|---|---|---|---|---|
| PoW2 | Final broiler percent power | Range: | 0, 10, 20, 30, 40, 50, 60, 70, 80, 90, 100 | Always visible. |
| | | Default: | 0 | |
| Tot t | Total time for broiler sequence | Range: | 0 to the Time for cooking (CooK) parameter | Always visible. |
| | | Default: | 0 | |
| SW t | Broiler switch time | Range: | 0 to the Time for cooking (CooK) parameter | Tot t is not 0. |
| | | Default: | 0 | |

The following are examples of Product/Menu Cooking Parameters.

| RAW DOUGH PIZZAS | TEMP | 550 |
|---|---|---|
| M1 | COOK TIME | 2:30 (Total Time) |
| (Fire) | TOP BROILER | BEG |
| (Switch Time) | 30 SECONDS | 100% (Power 1) |
| (Time Power 2 Applied) | 120 SECONDS | 60% (Power 2) |
| PAR BAKED PIZZAS | TEMP | 530 |
| M2 | COOK TIME | 2:30 (Total Time) |
| (Fire) | TOP BROILER | BEG |
| (Switch Time) | 30 SECONDS | 100% (Power 1) |
| (Time Power 2 Applied) | 60 SECONDS | 50% (Power 2) |

The following illustrates the programming procedure for setting the time for cooking and the broiler fire initiation of Table 18. The other four parameters of Table 18 can be set in a similar manner.

SETTING THE OVEN

Setting Cooking Procedures—Menus/Products:

Setting Menus—Simultaneously press & hold Keys C & F together for "3" seconds. This will enter the Menu Programming mode.

"M1" Appears for Menu 1.

Using Keys C or F, Scroll Up or Down to select an Automatic Menu for editing or adding a new menu. There are 23 Automatic Menus.

To change the menu parameters, press the Edit Button (Key A) which is the Left Start button.

The display will alternately flash "Cook" and "Minutes and Seconds".

Pressing the Edit Button (Key A) will stop the flashing and will display the minutes and seconds.

Using Keys C or F, Scroll Up or Down to increase or decrease the cooking time setting.

When the desired Cooking Time is chosen, press the Enter Button (Key B) to set it.

The display will alternately flash "Cook" and "Minutes and Seconds" again (this is to confirm the programmed values.)

Using Keys C or F, Scroll Down to the next parameter which is "Fire".

The display will alternately flash the words "Fire" and "BEG or END or DEL".

Pressing the Edit Button (Key A) will stop the flashing and "BEG or END or DEL" values will be displayed.

Using Keys C or F, Scroll Up or Down to switch between "BEG or END or DEL".

When the desired "Fire" value is displayed, press the Enter Button (Key B) to set it.

The display will alternately flash the words "Fire" and "BEG or END or DEL" (this is to confirm the programmed values.)

Continue this procedure until all Parameter Select Prompts are set.

Press Enter twice when all Prompts are set and this will return the operator to the Ready state.

In the configuration mode of the controller, there are equipment type submenus, setup submenus, thermal submenus, diagnostic submenus and error code messages which will not be described.

It is to be understood that the menus provided may be more or less than 23 and the default menu may be a menu different from menu one. Preferably it will be the most used menu.

The oven cooking process disclosed in connection with FIGS. 9–14 which defaults back to a given menu works without any problems as long as the food items to be cooked are not inserted into the oven rapidly one after another in which case the oven temperature may increase to a level sufficient to burn the later inserted food items. In accordance with the invention, this problem is avoided by programming the controller 81 to control the relays 151 and 171 to shut off elements 63 and 61 (disconnect electrical power from the elements 63 and 61) when the interior of the oven reaches a certain temperature (Brint), which is determined by the operator. This is very a important function to ensure a consistent cooking process and to prevent the oven from getting too hot and burning the food items. The controller 81 will automatically control relays 151 and 171 to apply electrical power to the elements 63 and 61 to turn the elements 63 and 61 back on when the temperature (Brint) returns below the Brint setpoint. Thus The controller 81 will control a timed broiling process without having a runaway temperature condition or burning the product.

In the operating process, the controller 81 is programmed to cause relay 161 to apply electrical power to the lower element 41 to maintain the temperature in the oven at a first setpoint i.e. 550° F. The thermocouple 183 senses the temperature in the oven and applies its output 91 to the controller 81 which in turns controls relay 161 to maintain the temperature in the oven at a temperature of at least i.e. 550° F. During a broiling sequence using heaters 63, 61 or 63 and 61, the controllers 81 is programmed to turn off the upper elements 63 and 61 if the temperature in the oven (as sensed by the thermocouple 183) reaches a second setpoint (Brint) which may be i.e. 585° F. The operator can determine and set this temperature. Without this control, the oven temperature may continue to rise if the food items were cooked one after another as explained previously. For example, the first food item may start cooking at a temperature of 550° F. The second food item may start cooking at a temperature of 570–580° F. The third food item may start cooking at 620° F. and probably will burn.

When either the left broiler 63 or the right broiler 61 or both broilers are executing any broil sequence, the broiler temperature interlock will be active. The broiler temperature interlock is not active during the "additional 10 seconds broiling sequence", only during a broil sequence. When the broiler temperature interlock is active and the output of the temperature sensor 183 represents a value which is greater than the programmed broiler temperature interlock (Brint) in the (Setup Submenu), both the left broiler 63 and the right broiler 61 will be disconnected from the electrical power and will be continuously "off" while the menu timer and process continues. The controller 81 has a timer which is actuated by each menu selected. When the output of the temperature sensor 183 is less than or equal to the programmed broiler temperature interlock (Brint in the Setup Submenu), either or both of the left broiler 63 and the right broiler 61 will be electrically connected to the electrical power leads and hence will be allowed to execute the broil sequence if either or both of these broilers have been selected for a broil sequence.

Figure 15:
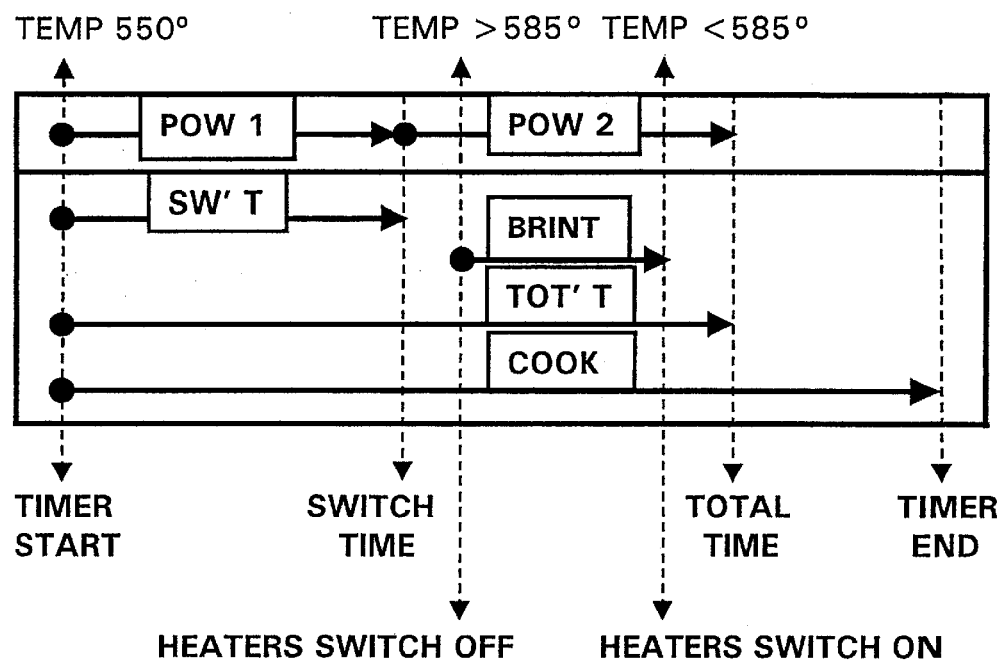
FIG. 15 illustrates a broiling sequence similar to that of FIG. 12, but also illustrates the broiler temperature interlock (BRINT) which is active during a broiler sequence.

As shown in FIG. 15, for a broiling sequence, the menu selected actuates the timer for the heating element or heating elements 63 or 61 or 63 and 61 selected. If the temperature sensed is greater than i.e. 585° F., the heating element or heating elements selected are turned off and remain off until the temperature falls below i.e. 585° F. while timing is carried out.

Figure 16A:
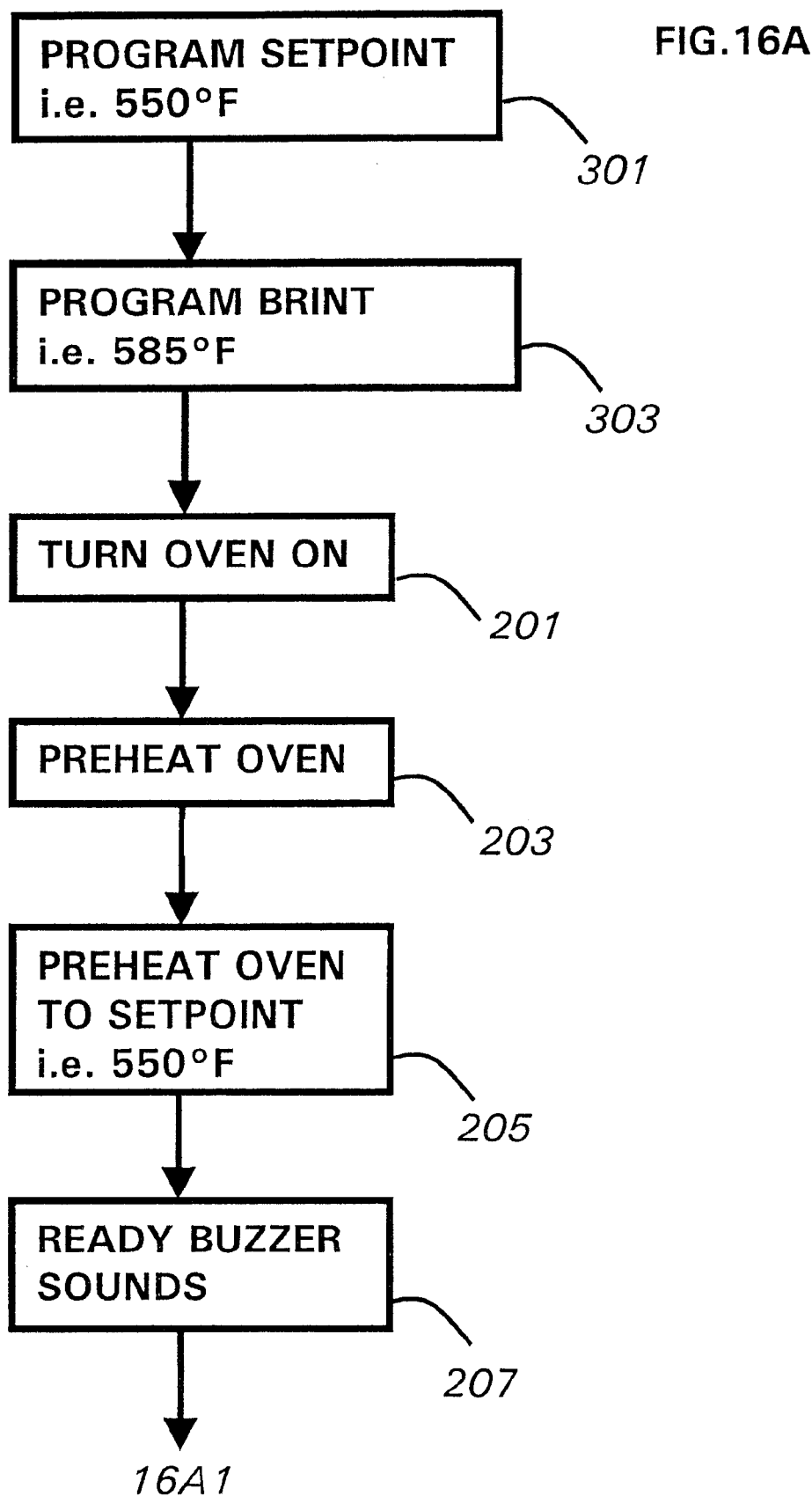
FIGS. 16A, 16B, 16C, 16D, 16E include the flow diagram of FIGS. 9A and 9B and add the Broiler Interlock portion of the flow diagram of the operating procedure.
Figure 16B:
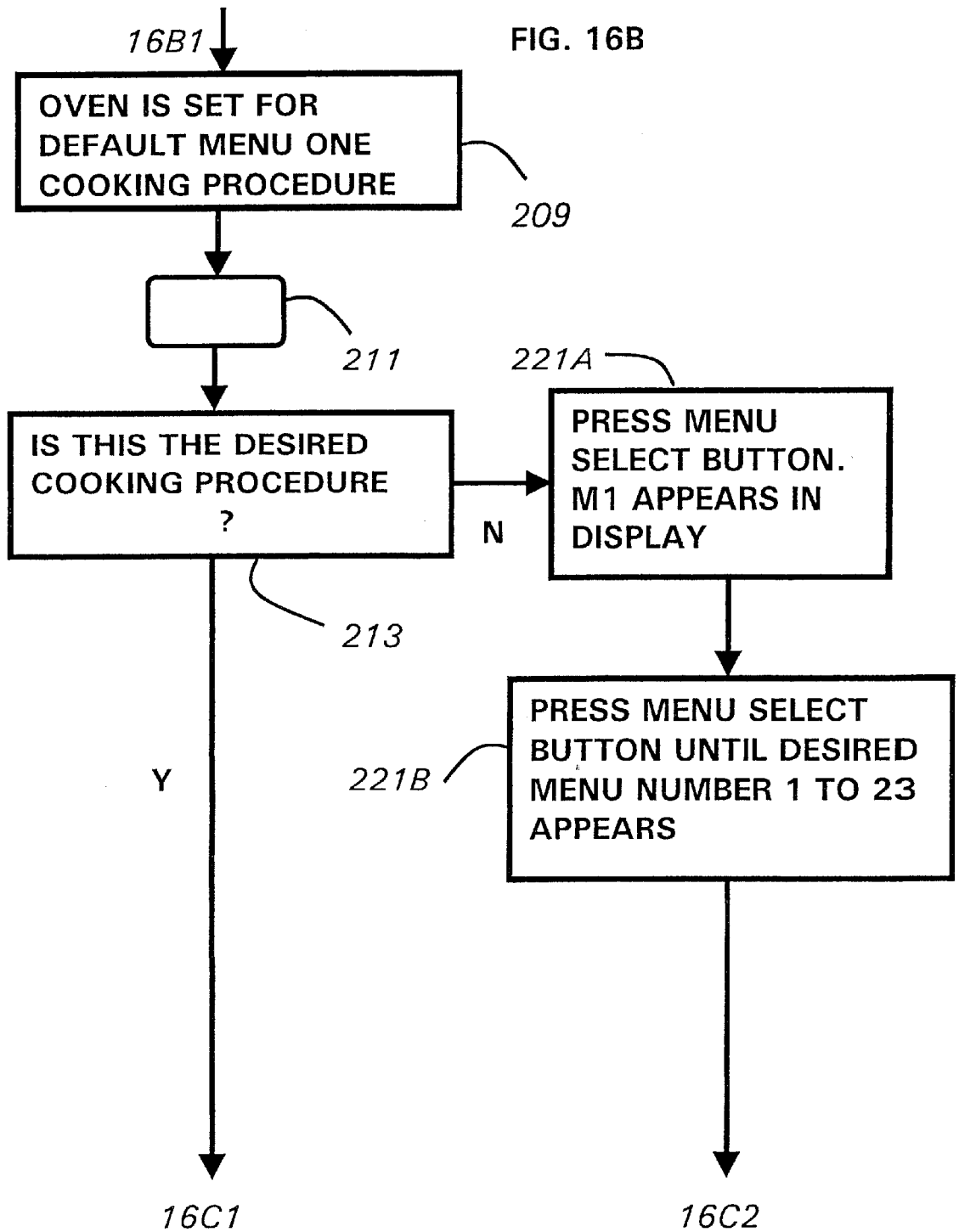
Figure 16C:
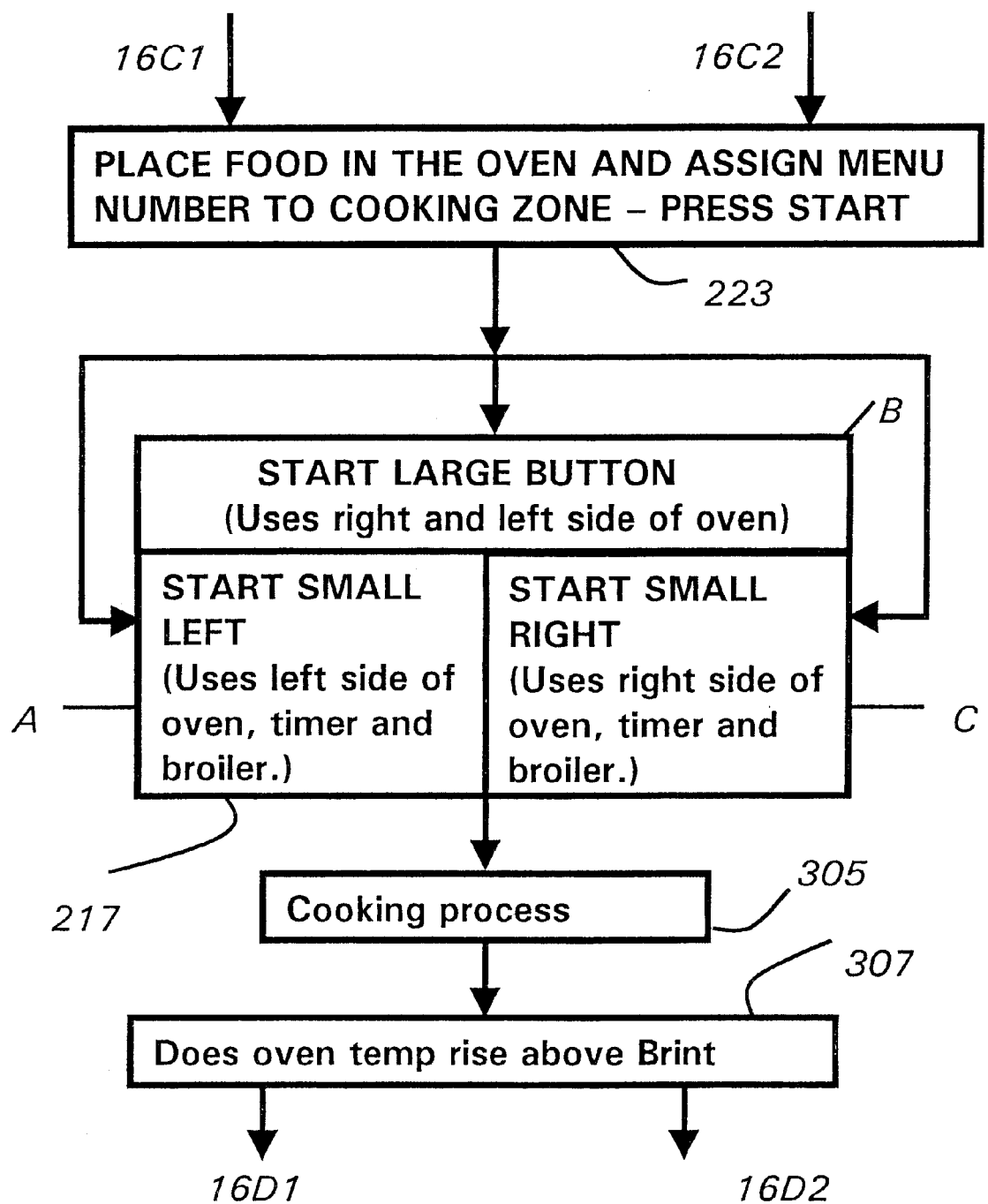
Figure 16D:
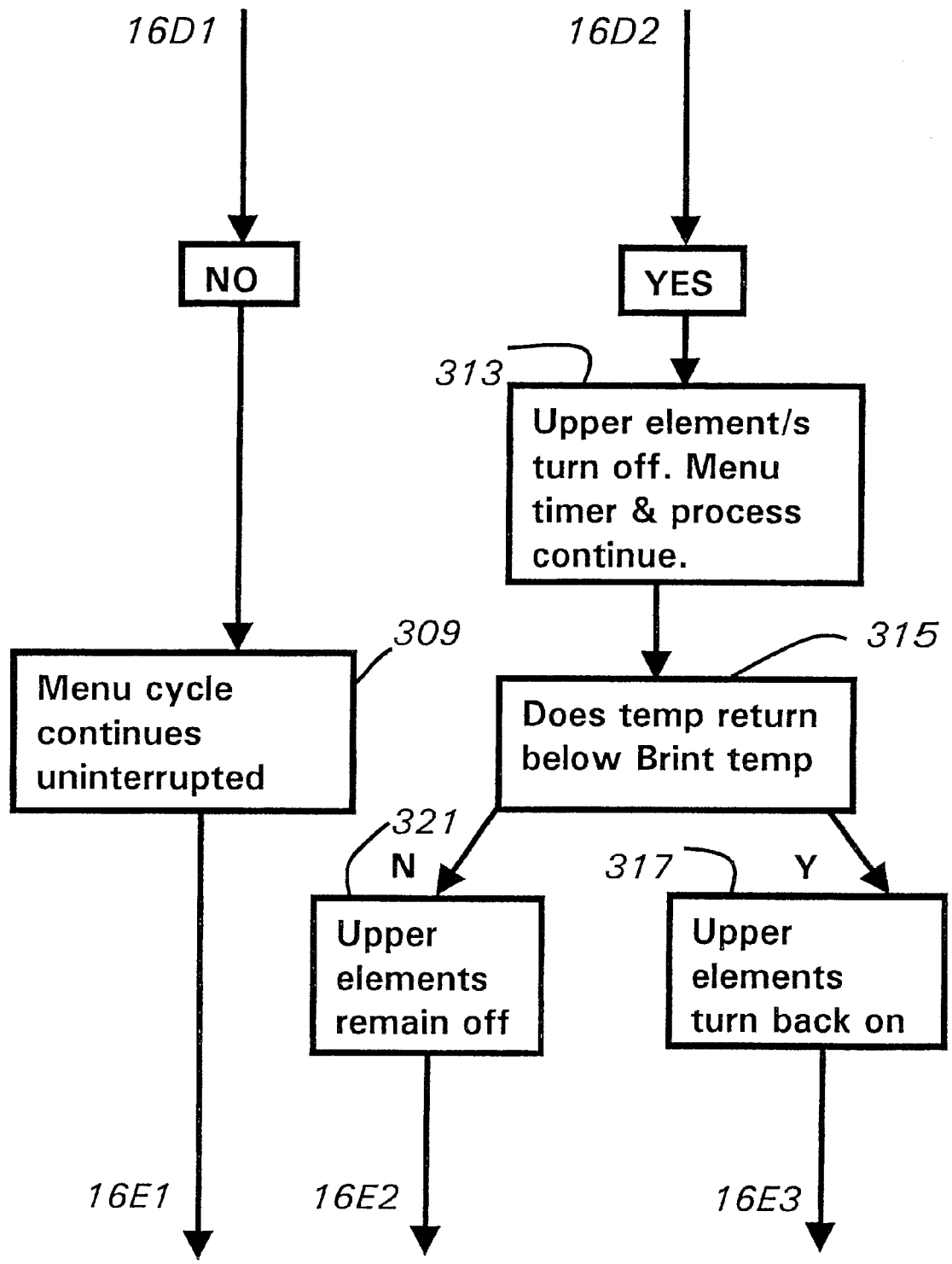
Figures 16E, 17:
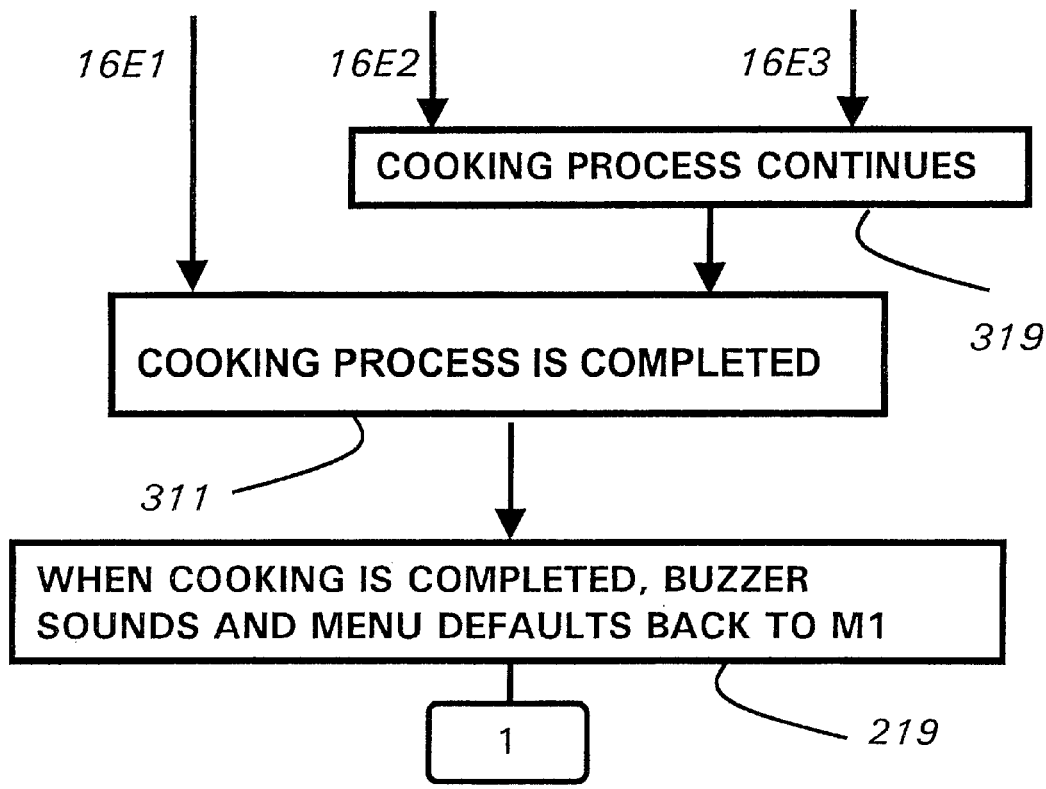
FIG. 17 illustrates a Setup Submenu.

The Setup Submenu is shown in FIG. 17. The Setup Submenu may be accessed by first simultaneously pressing and holding Key C and Key F for 3 seconds from the operating display. This will enter the Menu Programming Mode. Next, simultaneously press and hold Key D and Key E for 3 seconds. This will enter the Configuration Mode. Using the Increment and Decrement Keys scroll to the display SetUp and press the Edit key (Key A). The parameters and values of FIG. 17 are in the SetUp Submenu.

Referring to FIGS. 16A, 16B, 16C, 16D, 16E there will be described the procedure for operating the oven using the broiler temperature interlock. In FIGS. 16A, 16C, 16D, 16E the blocks having the same reference numerals as those of FIGS. 9A and 9B identify the same steps as those of FIGS. 9A and 9B. In FIGS. 16A and 16B, line 16A1 connects with line 16B1. In FIGS. 16B and 16C, lines 16C1 and 16C2 are connected together. In FIGS. 16C and 16D, lines 16D1 and 16D2 are connected together respectively. In FIGS. 16D and 16E lines 16E1, 16E2, 16E3 are connected together respectively. At 301 and 303, the Setpoint and Brint temperature levels are programmed into the controller 81. At 305 the cooking process begins. At 307 a determination is made as to whether the oven temperature rises above the Brint temperature. If not, the menu cycle continues uninterrupted at 309. The cooking process is competed at 311. At 219 when the cooking process is completed, the buzzer sounds and the menu defaults back to menu one.

At 307, if it is determined that the oven temperature rises above the Brint temperature, the process goes to 313 where the upper elements 63, 61 or 63 and 61 are turned off while the menu timer and process continue. A determination is made at 315 whether the temperature returns below the Brint temperature. If it does, at 317 the selected upper elements 63, 61 or 63 and 61 are turned back on, the cooking process continues at 319; it is completed at 311; and then the process goes to 219, etc.

At 315, if it is determined that the oven temperature does not return below the Brint temperature, the process goes to 321 which maintains the upper elements 63, 61, or 63, and 61 off; the cooking process continues at 319; and then the process goes to 219; etc.

Instead of completely disconnecting the electrical power from the heaters 61 or 63 or 61 and 63 selected, if the oven temperature rises above the Brint temperature, the controller 81 may operate the relays 161 and or 171 to reduce the electrical power to the elements 61 and/or 63 selected i.e. to 10% until the oven temperature falls below the Brint temperature.

The oven may be modified to have only one upper heating element 61 or 63 and its associated relay 171 or 151.

What is claimed is:

1. A cooking apparatus for cooking food, comprising:
a housing,
a support means located in said housing for supporting food to be cooked,
a lower electrical heating element located in said housing below said support means, first and second laterally spaced apart upper electrical heating elements located in said housing above said support means and the food to be cooked, power supply means for supplying electrical power, a first control means coupled to said power supply means and to said first electrical heating element, a second control means coupled to said power supply means and to said second electrical heating element, a third control means coupled to said power supply means and to said lower electrical heating element, a programmable controller having first, second, and third outputs coupled to said first, second, and third control means respectively for controlling the application of electrical power from said power supply means to said first, second, and lower electrical heating elements respectively, a temperature sensing means located in said housing and having an output coupled to said programmable controller, said programmable controller being responsive to said output of said temperature sensing means and being programmed to control said third control means to control the application of electrical power from said power supply means to said lower heating element to maintain the temperature within said housing at least at a given temperature level, said programmable controller having a plurality of different menus stored therein, menu selecting means for selecting any one of said plurality of different menus stored in said programmable controller, heating element selecting means for separately selecting any one of (a) said first heating element, (b) said second heating element, (c) the combination of said first and second heating elements, each menu selected having parameters for controlling the time and amount of electrical power applied to (a) said first heating element, (b) said second heating element, (c) the combination of said first and second heating elements selected, said programmable controller being responsive to said output of said temperature sensing means and being programmed to control said first and second control means to decrease the temperature generated by said (a) first heating element, (b) said second heating element, (c) the combination of said first and second heating elements selected in the event the temperature in said housing increases above an upper temperature level greater than said given temperatures level.

2. The cooking apparatus of claim 1, wherein:

said programmable controller is programmed to control said first and second control means to disconnect the electrical power applied to said (a) first heating element, (b) said second heating element, (c) the combination of said first and second heating elements in the event the temperature in said housing increases above said upper temperature level.

3. The cooking apparatus of claim 1, wherein:

each of said plurality of menus has a given time period, said programmable controller being programmed to default to a given menu after termination of the time period of said menu selected.

4. The cooking element of claim 2, wherein:

each of said plurality of menus has a given time period, said programmable controller being programmed to default to a given menu after termination of the time period of said menu selected.

5. A cooking apparatus for cooking food, comprising:

a housing, a support means located in said housing for supporting food to be cooked, a lower electrical heating element located in said housing below said support means, an upper electrical heating element located in said housing above said support means and the food to be cooked, power supply means for supplying electrical power, a broiler control means coupled to said power supply means and to said upper electrical heating element, a control means coupled to said power supply means and to said lower electrical heating element, a programmable controller having separate outputs coupled to said broiler control means and to said control means coupled to said lower heating element respectively for controlling the application of electrical power from said power supply means to said upper and lower electrical heating elements respectively, a temperature sensing means located in said housing and having an output coupled to said programmable controller, said programmable controller being responsive to said output of said temperature sensing means and being programmed to control said control means coupled to said lower heating element to control the application of electrical power from said power supply means to said lower heating element to maintain the temperature within said housing at least at a given temperature level, said programmable controller having a plurality of different menus stored therein, menu selecting means for selecting any one of said plurality of different menus stored in said programmable controller, heating element selecting means for selecting said upper heating element, each menu selected having parameters for controlling the time and amount of electrical power applied to said upper heating element, said programmable controller being programmed to control said broiler control means to decrease electrical power applied to said upper heating element in the event the temperature in said housing increases above an upper temperature level greater than said given temperature level.

6. The cooking apparatus of claim 5, wherein:

said programmable controller is programmed to control said broiler control means to disconnect the electrical power applied to said upper heating element in the event the temperature in said housing increases above said upper temperature level.

7. The cooking apparatus of claim 5, wherein:

each of said plurality of menus has a given time period, said programmable controller being programmed to default to a given menu after termination of the time period of said menu selected.

8. The cooking apparatus of claim 6, wherein:

each of said plurality of menus has a given time period, said programmable controller being programmed to default to a given menu after termination of the time period of said menu selected.

* * * * *